(12) United States Patent
Heinonen et al.

(10) Patent No.: US 12,524,774 B2
(45) Date of Patent: Jan. 13, 2026

(54) COMPUTATION OF USER-SPECIFIC ITEM-RELATED VALUES ON AN ELECTRONIC PROCESSING PLATFORM

(71) Applicant: Storeverse Oy, Vantaa (FI)

(72) Inventors: Veijo Heinonen, Kellokoski (FI); Mikko Saikko, Lappeenranta (FI)

(73) Assignee: STOREVERSE OY, Vantaa (FI)

( * ) Notice: Subject to any disclaimer, the term of this patent is extended or adjusted under 35 U.S.C. 154(b) by 0 days.

(21) Appl. No.: 17/260,866

(22) PCT Filed: Jul. 16, 2019

(86) PCT No.: PCT/FI2019/050548
§ 371 (c)(1),
(2) Date: Jan. 15, 2021

(87) PCT Pub. No.: WO2020/016482
PCT Pub. Date: Jan. 23, 2020

(65) Prior Publication Data
US 2021/0256548 A1    Aug. 19, 2021

(30) Foreign Application Priority Data
Jul. 18, 2018    (EP) .................................... 18184120

(51) Int. Cl.
*G06Q 30/02*    (2023.01)
*G06N 5/04*    (2023.01)
(Continued)

(52) U.S. Cl.
CPC ........... *G06Q 30/0206* (2013.01); *G06N 5/04* (2013.01); *G06Q 30/0201* (2013.01);
(Continued)

(58) Field of Classification Search
CPC .......... G06Q 30/0206; G06Q 30/0201; G06Q 30/0239; G06Q 30/0255; G06Q 30/0631; G06Q 30/0269; G06N 5/04
See application file for complete search history.

(56) References Cited

U.S. PATENT DOCUMENTS 5,261,098 A    11/1993   Katin et al.
8,170,925 B1 *    5/2012   Hines ................. G06Q 30/0223
                                                              705/14.5
(Continued)

FOREIGN PATENT DOCUMENTS

CN    1591446 A    3/2005
CN    102456203 A    5/2012
(Continued)

OTHER PUBLICATIONS

"Modeling the Distribution of Price Sensitivity and Implications for Optimal Retail Pricing" (Blattberg, Robert C et al., published in Journal of Business and Economic Statistics, Feb. 1995) (Year: 1995).*

(Continued)

*Primary Examiner* — James M Detweiler
(74) *Attorney, Agent, or Firm* — Finnegan, Henderson, Farabow, Garrett & Dunner, LLP

(57) ABSTRACT

According to an embodiment, a computing apparatus comprises at least one processor and at least one memory including computer program code. The at least one memory and the computer program code may be configured to, with the at least one processor, cause the computing apparatus to: calculate a user-specific price of an item. The computing apparatus may calculate the user-specific price based on various factors, such as a score of a user attribute profile vector of the user and an item attribute vector of the item, a (Continued)

price elasticity, and an appeal score. A computing apparatus, a method, and a computer program are described.

13 Claims, 12 Drawing Sheets

(51) Int. Cl.
  *G06Q 30/0201*    (2023.01)
  *G06Q 30/0207*    (2023.01)
  *G06Q 30/0251*    (2023.01)
  *G06Q 30/0601*    (2023.01)
(52) U.S. Cl.
  CPC ..... *G06Q 30/0239* (2013.01); *G06Q 30/0255* (2013.01); *G06Q 30/0631* (2013.01)

(56) References Cited

U.S. PATENT DOCUMENTS

| | | | |
|---|---|---|---|
| 10,007,946 | B1 | 6/2018 | Levy et al. |
| 10,572,925 | B1* | 2/2020 | Roy Chowdhury ........................ G06F 16/24578 |
| 11,216,843 | B1* | 1/2022 | Roy Chowdhury ........................ G06F 16/24578 |
| 2002/0010625 | A1 | 1/2002 | Smith et al. |
| 2004/0059626 | A1 | 3/2004 | Smallwood |
| 2004/0103024 | A1 | 5/2004 | Patel et al. |
| 2005/0080682 | A1 | 4/2005 | Wilson |
| 2006/0282339 | A1 | 12/2006 | Musgrove et al. |
| 2010/0094878 | A1 | 4/2010 | Soroca et al. |
| 2011/0145226 | A1 | 6/2011 | Gollapudi et al. |
| 2011/0314040 | A1 | 12/2011 | Mori et al. |
| 2012/0030159 | A1 | 2/2012 | Pilászy et al. |
| 2012/0130726 | A1* | 5/2012 | Subramanian .......... G06F 17/11 705/1.1 |
| 2012/0158474 | A1* | 6/2012 | Fahner ................ G06Q 30/0211 705/14.13 |
| 2013/0198022 | A1* | 8/2013 | Zhang ................... G06Q 30/02 705/26.1 |
| 2014/0074602 | A1 | 3/2014 | van Elsas et al. |
| 2015/0032526 | A1 | 1/2015 | Calman et al. |
| 2015/0073931 | A1 | 3/2015 | Ronen et al. |
| 2015/0120614 | A1 | 4/2015 | Westphal |
| 2015/0161635 | A1* | 6/2015 | Yuan ................... G06Q 30/0206 705/7.35 |
| 2015/0186934 | A1 | 7/2015 | Van Deventer et al. |
| 2016/0225062 | A1 | 8/2016 | Inman et al. |
| 2017/0140403 | A1 | 5/2017 | Fujita et al. |
| 2017/0337612 | A1 | 11/2017 | Galron et al. |
| 2018/0089707 | A1* | 3/2018 | Sills ..................... G06Q 10/067 |
| 2018/0150858 | A1* | 5/2018 | Kimmerling ...... G06Q 30/0206 |
| 2018/0197177 | A1 | 7/2018 | Lee et al. |
| 2018/0268429 | A1* | 9/2018 | Pradip ................. G06Q 10/067 |
| 2019/0172120 | A1 | 6/2019 | Kimmerling |
| 2019/0362220 | A1* | 11/2019 | Yap ........................ G06N 3/045 |
| 2021/0256547 | A1 | 8/2021 | Heinonen et al. |

FOREIGN PATENT DOCUMENTS

| | | | |
|---|---|---|---|
| CN | 103593763 | A | 2/2014 |
| CN | 104820879 | A | 8/2015 |
| CN | 106067132 | A | 11/2016 |
| CN | 107424029 | A | 12/2017 |
| CN | 110163705 | * | 2/2018 |
| CN | 108182621 | A | 6/2018 |
| CN | 108261766 | | 7/2018 |
| GB | 2548336 | | 9/2017 |
| GB | 2548336 | A | 9/2017 |
| JP | 2002015231 | A | 1/2002 |
| JP | 2004127075 | A | 4/2004 |
| JP | 2004-519021 | A | 6/2004 |
| JP | 2006190127 | A | 7/2006 |
| JP | 2013228826 | A | 11/2013 |
| JP | 2017182366 | | 10/2017 |
| JP | 2018-028818 | A | 2/2018 |
| WO | WO 01/91001 | A2 | 11/2001 |
| WO | WO 2006/055021 | A1 | 5/2006 |
| WO | WO 2007/024736 | A2 | 3/2007 |
| WO | WO 2012/036736 | A1 | 3/2012 |
| WO | WO 2013/181636 | A2 | 12/2013 |
| WO | WO2016016934 | | 2/2016 |
| WO | WO 2016/074022 | A1 | 5/2016 |
| WO | WO 2017/095371 | A1 | 6/2017 |

OTHER PUBLICATIONS

European Search Report from Priority Application No. 18184120.6 dated Oct. 16, 2018.
International Search Report from International Application No. PCT/EP2019/069065 dated Aug. 29, 2019.
International Search Report from International Application No. PCT/FI2019//050547 dated Dec. 13, 2019.
International Search Report from International Application No. PCT/FI2019/050548 dated Feb. 19, 2020.
Office Action from corresponding Japanese Application No. 2021-525381, mailed May 24, 2022.
Notice of Reasons for Refusal from corresponding Japanese Application No. 2021-525367 dated May 31, 2022 (10 Pages).
Notice of Reasons for Refusal from corresponding Japanese Application No. 2021-525380 dated May 31, 2022 (16 pages).
Office Action in U.S. Appl. No. 17/260,854 dated Aug. 10, 2022 (40 pages).
Chinese Office Action from Chinese Application No. 201980048018.X dated Jun. 29, 2023 (12 pages).
Chinese Office Action from Chinese Application No. 201980048109.3 dated Jun. 29, 2023 (8 pages).
Chinese office Action from Chinese Application No. 201980048017.5 dated Jun. 29, 2023 (7 pages).
Pretrial Report dated Jun. 28, 2023, from JP Application No. 2021-525367 (2 pages).
CN Office Action for corresponding CN Application No. 201980048018.X dated Mar. 12, 2024 (36 pages).
Mota, V. (2015). UI design for wearable devices (Order No. 29150529). Available from ProQuest Dissertations and Theses Professional. (2689296188). Retrieved from https ://dialog.proquest.com/professional/docvlew/2689296188?accountid=131444 (Year: 2015).

* cited by examiner

223

| item | |
|---|---|
| attribute | value |
| attr1 | {0,1} |
| attr2 | {0,1} |
| attr3 | {0,1} |
| attr4 | {0,1} |
| attr5 | {0,1} |

| food item | | |
|---|---|---|
| ID | attribute | value |
| 1 | organic | 1 |
| 2 | lactose free | 0 |
| 3 | low lactose | 1 |
| 4 | vegan | 0 |
| 5 | vegetarian | 1 |
| 6 | gluten free | 0 |
| 7 | high protein | 0 |

| hygiene item | | |
|---|---|---|
| ID | attribute | value |
| 8 | dry skin | 1 |
| 9 | allergy | 0 |
| 10 | sensitive skin | 1 |
| 4 | vegan | 0 |
| 1 | organic | 1 |

FIG. 8

| hygiene item | | |
|---|---|---|
| ID | attribute | value |
| 1 | organic | 1 |
| 2 | lactose free | n/a |
| 3 | low lactose | n/a |
| 4 | vegan | 0 |
| 5 | vegetarian | n/a |
| 6 | gluten free | n/a |
| 7 | high protein | n/a |
| 8 | dry skin | 1 |
| 9 | allergy | 0 |
| 10 | sensitive skin | 1 |

| user | |
|---|---|
| item ID ↙901 | number purchased ↙902 |
| ID1 | n1 |
| ID2 | n2 |
| ID3 | n3 |
| ID4 | n4 |
| ID5 | n5 |

| user | | |
|---|---|---|
| attr ID ↙226 | attribute | value ↙213 |
| ID1 | attr1 | 0...1 |
| ID2 | attr2 | 0...1 |
| ID3 | attr3 | 0...1 |
| ID4 | attr4 | 0...1 |
| ID5 | attr5 | 0...1 |

| user | | |
|---|---|---|
| ID ↙226 | attribute | value ↙213 |
| 1 | organic | 0.1 |
| 2 | lactose free | 0.01 |
| 3 | low lactose | 0.126 |
| 4 | vegan | 0.148 |
| 5 | vegetarian | 0.42 |
| 6 | gluten free | 0.3 |
| 7 | high protein | 0.72 |

FIG. 12

COMPUTATION OF USER-SPECIFIC ITEM-RELATED VALUES ON AN ELECTRONIC PROCESSING PLATFORM

TECHNICAL FIELD

The disclosure relates to an electronic device, and more particularly to a computing apparatus for determining item-related values. Furthermore, the disclosure relates to corresponding methods and a computer program.

BACKGROUND

E-commerce platforms are becoming more common in many industries and product groups. Users search and purchase more and more products and services through the Internet. Many users access these e-commerce platforms using mobile devices, such as mobile phones and tablet computers. Quick purchase decisions are common, which may emphasize the impact of items price on the purchase decision compared to other factors, such as the brand of the item.

Currently, e-commerce platforms may comprise thousands or even hundreds of thousands of items. Even a single item category may comprise thousands of items, which may make it difficult and time-consuming a user to find the correct item. Furthermore, comparing prices may be difficult, since items may not be the same on different e-commerce platforms. Due to these and other challenges, determining the price of an item on an e-commerce platform may be difficult.

Patent publication US2015/0120614 A1 discloses a method for optimising product prices. The method comprises receiving a request from a user for an offer price of a product offered for sale; retrieving a current price from a database, the current price being associated with a product offered for sale; identifying a price range to which the current price corresponds, wherein the price range encompasses a series of prices between an upper limit and a lower limit; executing a pricing process that computes an offer price based on the current price, wherein the pricing process is associated with the identified price range; associating the offer price with the product; and providing the offer price to the user.

SUMMARY

This summary is provided to introduce a selection of concepts in a simplified form that are further described below in the detailed description. This summary is not intended to identify all key features or all essential features of the claimed subject matter, nor is it intended to be used to limit the scope of the claimed subject matter.

It is an objective to provide a computing apparatus for calculating user-specific prices of items. The objective is achieved by the features of the independent claims. Further implementation forms are provided in the dependent claims, the description and the figures.

According to a first aspect, a computing apparatus comprises at least one processor and at least one memory including computer program code, the at least one memory and the computer program code configured to, with the at least one processor, cause the computing apparatus to: calculate a similarity score between a user attribute profile vector of a user and an item attribute vector of an item by comparing corresponding attribute values in the attribute profile vector and in the item attribute vector; obtain a price elasticity; calculate an appeal score based on the similarity score and the price elasticity; and calculate a user-specific price of the item based at least on the appeal score and the price elasticity. With such configurations, the computing apparatus may be able to, for example, calculate a user-specific price for each item. Thus, the user may be able to find a reasonably priced item faster and with less effort.

In an implementation form of the first aspect, the at least one memory and the computer program code are configured to, with the at least one processor, cause the computing apparatus to: calculate the appeal score using a product comprising the similarity score and the price elasticity. With such configurations, the computing apparatus may be able to, for example, calculate the appeal score in such a fashion that it reflects the similarity of the item and the user and the price elasticity.

In a further implementation form of the first aspect, the at least one memory and the computer program code are configured to, with the at least one processor, cause the computing apparatus to: calculate the price elasticity based on an action history of the user. With such configurations, the computing apparatus may be able to, for example, utilise the past actions, such as purchases, of the user when calculating the price elasticity.

In a further implementation form of the first aspect, the at least one memory and the computer program code are configured to, with the at least one processor, cause the computing apparatus to: calculate a predicted demand based on the price elasticity; calculate a price of optimal margin based on the predicted demand and the price elasticity; and calculate the user-specific price for the item based at least on the appeal score and the price of optimal margin. With such configurations, the computing apparatus may be able to, for example, utilise the price of optimal margin when calculating the user-specific price.

In a further implementation form of the first aspect, the at least one memory and the computer program code are configured to, with the at least one processor, cause the computing apparatus to: calculate a discount percentage based at least on the predicted demand and the price sensitivity; and calculate the user-specific price for the item based at least on the appeal score, the price of optimal margin, and the discount percentage.

In a further implementation form of the first aspect, the at least one memory and the computer program code are configured to, with the at least one processor, cause the computing apparatus to: obtain at least one control parameter; and calculate the discount percentage of the user based on the price sensitivity, the predicted demand, and the at least one control parameter. With such configurations, the computing apparatus may be able to, for example, limit the amount of discounts allocated to each user.

In a further implementation form of the first aspect, the at least one control parameter comprises a target discount percentage and a user-specific sale volume prediction. With such configurations, the computing apparatus may be able to, for example, calculate the user-specific price based on the control parameters.

In a further implementation form of the first aspect, the at least one control parameter comprises a first deviation parameter indicating an upper limit for the user-specific price of the item, and a second deviation parameter indicating a lower limit for the user-specific price of the item. With such configurations, the computing apparatus may be able to, for example, receive control parameters that may define limits for the user-specific price.

In a further implementation form of the first aspect, the at least one memory and the computer program code are configured to, with the at least one processor, cause the computing apparatus to: calculate the user-specific price for the item based at least on the appeal score, the price of optimal margin, the discount percentage, and the at least one control parameter. With such configurations, the computing apparatus and the user-specific price may be controlled using the control parameters.

In a further implementation form of the first aspect, the at least one memory and the computer program code are configured to, with the at least one processor, cause the computing apparatus to: order a plurality of items according to the appeal score of each item; and calculate a user-specific prices for the items in the order until the discount percentage is fulfilled. With such configurations, the computing apparatus may be able to, for example, control the discount allocation for each user.

In a further implementation form of the first aspect, the at least one memory and the computer program code are configured to, with the at least one processor, cause the computing apparatus to: transmit the user-specific price of the item to a client device. With such configurations, the computing apparatus may be able to, for example, enable the client device to display the user-specific price to a user of the client device.

In a further implementation form of the first aspect, the at least one memory and the computer program code are configured to, with the at least one processor, cause the computing apparatus to: display the user-specific price of the item to a user of the computing apparatus. With such configurations, the computing apparatus may be able to, for example, display the user-specific price to a user of the computing apparatus.

According to a second aspect, a method comprises: calculating a similarity score between a user attribute profile vector of a user and an item attribute vector of an item by comparing corresponding attribute values in the attribute profile vector and in the item attribute vector; obtaining a price elasticity; calculating an appeal score based on the similarity score and the price elasticity; and calculating a user-specific price of the item based at least on the appeal score and the price elasticity.

According to a third aspect, a computer program is provided, comprising program code configured to perform a method according to the second aspect when the computer program is executed on a computer.

Many of the attendant features will be more readily appreciated as they become better understood by reference to the following detailed description considered in connection with the accompanying drawings.

DESCRIPTION OF THE DRAWINGS

The present description will be better understood from the following detailed description read in light of the accompanying drawings, wherein:

FIG. 6 illustrates a schematic representation of an item attribute vector according to an embodiment;

FIG. 7 illustrates a schematic representation of a food item attribute vector according to an embodiment;

FIG. 8 illustrates a schematic representation of a hygiene item attribute vector according to an embodiment;

FIG. 9 illustrates a schematic representation of a hygiene item attribute vector according to another embodiment;

FIG. 10 illustrates a schematic representation of user action history according to an embodiment;

FIG. 11 illustrates a schematic representation of a user attribute profile according to an embodiment;

FIG. 12 illustrates a schematic representation of a user attribute profile according to another embodiment;

Like references are used to designate like parts in the accompanying drawings.

DETAILED DESCRIPTION

The detailed description provided below in connection with the appended drawings is intended as a description of the embodiments and is not intended to represent the only forms in which the embodiment may be constructed or utilized. However, the same or equivalent functions and structures may be accomplished by different embodiments.

Figure 1:
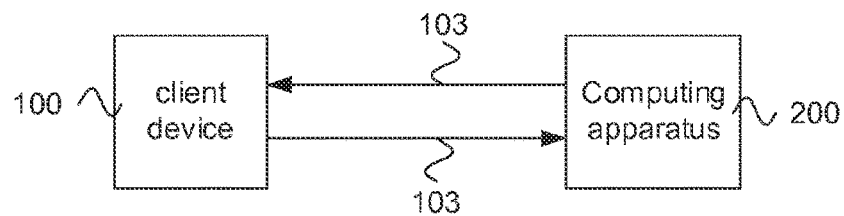
FIG. 1 illustrates a schematic representation of a client device and a computing apparatus configured to determine relevancy of items to a user according to an embodiment.

FIG. 1 illustrates a schematic representation of a client device 100 and a computing apparatus 200. The client device 100 can communicate with the computing apparatus 200 using a communication channel 103, and the computing apparatus 200 can communicate with the client device 100 using the communication channel 103. The client device 100 may transmit requests to the computing apparatus 200, and the computing apparatus may respond to these requests by transmitting responses to the client device 100. In some embodiments, the client device 100 and the computing apparatus 200 are implemented in the same device. In such embodiments, any functionality of either device may be implemented in this single device.

According to an embodiment, the computing apparatus 200 comprises at least one processor and at least one memory including computer program code. The at least one memory and the computer program code may be configured to, with the at least one processor, cause the computing apparatus to: calculate a similarity score between a user attribute profile vector of a user and an item attribute vector of an item by comparing corresponding attribute values in the attribute profile vector and in the item attribute vector.

The at least one memory and the computer program code may be configured to, with the at least one processor, cause the computing apparatus to obtain a price elasticity and calculate an appeal score based on the similarity score and the price elasticity The at least one memory and the computer program code may be configured to, with the at least one processor, cause the computing apparatus to calculate a user-specific price of the item based at least on the appeal score and the price elasticity.

The computing apparatus 200 may be able to calculate an appropriate price for each item-user pair. Thus, using the computing apparatus 200, appropriate prices may be set for each user on, for example, an e-commerce platform. This may improve margins of the e-commerce platform and/or improve price competitiveness of the e-commerce platform.

According to an embodiment, the computing apparatus 200 is configured to calculate a user attribute profile vector based on a user action history of a user, wherein the user attribute profile vector comprises a first plurality of attribute values, wherein the first plurality of attribute values describe properties of the user action history. The computing apparatus may be configured to obtain an item attribute vector of an item comprising a second plurality of attribute values and an indication of attributes that are applicable to the item, wherein the second plurality of attribute values describe properties of the item. The computing apparatus 200 may be configured to compare corresponding attribute values that are applicable to the item in the first plurality of attribute values and in the second plurality of attribute values. The computing apparatus 200 may be configured to calculate a similarity score based on the comparison. The computing apparatus 200 may be configured to process a plurality of items using at least the similarity score of each item and transmit data indicating the processed plurality of items to a client device 100.

Thus, the computing apparatus 200 may be configured to calculate a user attribute profile vector based on a user action history of a user and calculate a similarity score between the user attribute profile vector and an item attribute vector of an item, wherein only attributes that are applicable to the item are used for the calculation from the user attribute profile vector. The similarity score may reflect how similar an item is with the previous actions of the user. A low similarity score may indicate high similarity and vice versa. An item of high similarity may be referred to as a relevant item to the user.

According to an embodiment, the client device 100 is configured to receive data indicating a processed plurality of items from a computing apparatus 200; and display at least one item view to a user according to the data received from the computing apparatus, wherein each item view in the at least one item view comprises a name of an item; wherein the processed plurality of items is based on a calculated similarity score of each item in the plurality of items, wherein the calculated similarity score is obtained by comparing corresponding attribute values that are applicable to an item in a first plurality of attribute values comprised in a user attribute profile vector and in a second plurality of attribute values comprised in an item attribute vector.

The computing apparatus 200 may be further configured to process an order for a plurality of items using at least the similarity score of each item. The computing apparatus can, for example, order/rank the items in a descending or ascending order according to the similarity scores. For example, most relevant items to the user may be first in the processed order.

The computing apparatus 200 may be configured to process a plurality of items using at least the similarity score of each item and to transmit data indicating the processed plurality of items to a client device 100.

The computing apparatus 200 may be further configured to transmit data indicating the processed order of the plurality of items to a client device 100. The data may be, for example, list that indicates the order or the similarity scores. Alternatively or additionally, the computing apparatus 200 may omit transmitting an order of items to the client device 200. Instead, the computing apparatus may transmit, for example, data indicating a subset of items to the client device 100. The computing apparatus 200 may choose the subset based on the similarity scores of the items. For example, the computing apparatus 200 may indicate items that have a similarity score higher than a preconfigured threshold.

The client device 100 can display the plurality of items according to the order for example so that most relevant items are displayed to the user first. Thus, the possibly limited display area of the client device 100 can be utilised efficiently.

The client device 100 and the computing apparatus 200 may further comprise a processor, a transceiver, a memory, a display unit and/or other components that are not illustrated in FIG. 1. The client device 100 may communicate with, for example, the computing apparatus 200 using a transceiver. The computing apparatus 200 may communicate with, for example, a single or a plurality of client devices 100 using a transceiver. The communication channel 103 may comprise, for example, wireless connections, wired connections, network nodes, network devices, or some combination of these. The communication channel 103 may comprise, for example, internet, Ethernet, 3G, 4G, 5G, LTE, Wi-Fi, or any other wired or wireless connections or some combination of these. For example, if the client device 100 is a mobile device, the communication channel 103 may comprise a wireless connection, such as Wi-Fi, an Internet connection, and a plurality of Ethernet connections. The client device 100 and the computing apparatus 200 may also utilise a plurality of communication channels 103 simultaneously and/or sequentially.

The client device 100 may be any of a wireless terminal, or mobile terminal which is enabled to communicate wirelessly in a wireless communication system, sometimes also referred to as a cellular radio system, or in a wired communication system using a wired connection. A wired connection may also comprise fixed connections, such as optical links. The client device 100 may further be referred to as a mobile telephone, a cellular telephone, a computer, a desktop computer, a computer tablet, or a laptop with wireless or wired capability.

A user may operate the client device 100 through a user interface, UI. Since the amount of display area on the client device 100 can be limited, for example in the case of a mobile phone or even for a desktop computer, the UI may also be limited. For example, on an e-commerce platform, only a limited number of items can be displayed to the user at a time. Therefore, the user experience may be improved, if the limited number of items that can be displayed to the user at once are relevant or pertinent to the user.

Figure 2:
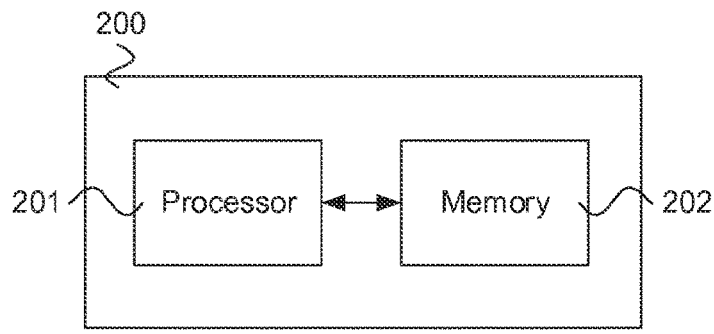
FIG. 2 illustrates a schematic representation of a computing apparatus according to an embodiment.

FIG. 2 illustrates a schematic representation of a computing apparatus 200 according to an embodiment. The computing apparatus 200 may comprise one or more processors 201, and one or more memories 202 that comprise computer program code.

Although the computing apparatus 200 is depicted to comprise only one processor 201 in the embodiment of FIG. 2, the computing apparatus 200 may comprise more processors. In an embodiment, the memory 202 is capable of storing instructions, such as an operating system and/or various applications.

Furthermore, the processor 201 is capable of executing the stored instructions. In an example embodiment, the processor 201 may be embodied as a multi-core processor, a single core processor, or a combination of one or more multi-core processors and one or more single core processors. For example, the processor 201 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an example embodiment, the processor 201 may be configured to execute hard-coded functionality. In an embodiment, the processor 201 is embodied as an executor of software instructions, wherein the instructions may specifically configure the processor 201 to perform the algorithms and/or operations described herein when the instructions are executed.

The memory 202 may be embodied as one or more volatile memory devices, one or more non-volatile memory devices, and/or a combination of one or more volatile memory devices and non-volatile memory devices. For example, the memory 202 may be embodied as semiconductor memories (such as mask ROM, PROM (programmable ROM), EPROM (erasable PROM), flash ROM, RAM (random access memory), etc.).

The computing apparatus 200 may be any device that can process information, for example, using a processor and may communicate with the client device 100 or a plurality of client devices 100 using, for example, the communication channel 103. The computing apparatus 200 may be also referred to as a server. The computing apparatus 200 may be implemented, for example, using a computer or a plurality of computers, such as a data centre. Alternatively, a computer or a plurality of computers may implement a plurality of computing apparatus 200 using, for example, virtualisation, wherein the computing apparatus 200 may be implemented in software.

An item may be, for example, any product that a user may, for example, purchase or view. The user may purchase and/or view the item, for example, on an e-commerce platform. Items may be divided into categories, and these categories may comprise, for example, food items, animal food items, hygiene items, cleaning items, consumer goods etc. These categories may be divided into further subcategories. For example, food items may be divided into vegetables, fruits, meats, dairy items, breads, drinks etc.

In some embodiments, the computing apparatus 200 may be connected to a display device, such as a screen or a monitor. For example, the computing apparatus may comprise a mobile device and the mobile device may comprise a screen. The computing apparatus 200 may be configured to display information to a user using the display device. For example, the computing apparatus 200 may be configured to display a user interface, UI, to a user, and the UI may comprise information displayed to the user. The information may comprise, for example, one or more items, prices of items, user-specific prices of items, and/or campaigns.

Figure 3:
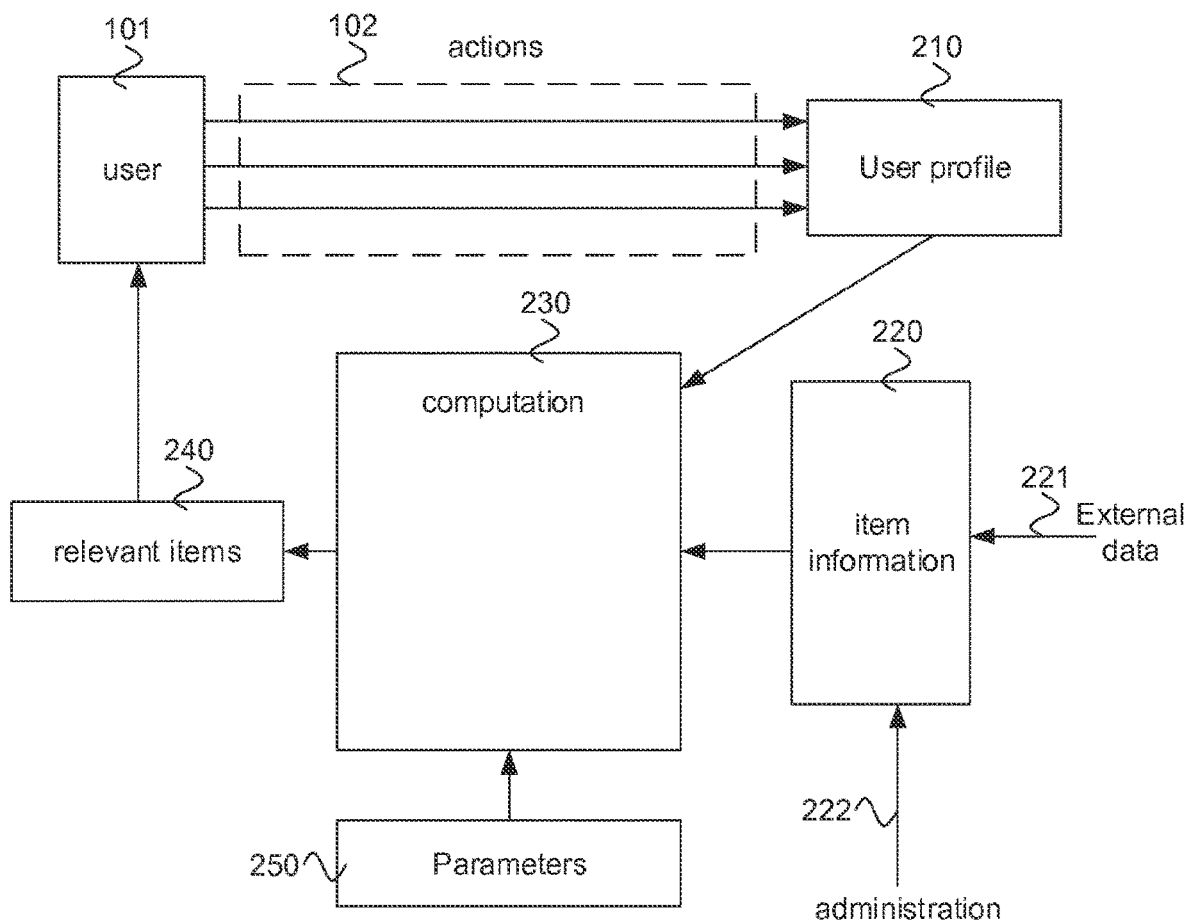
FIG. 3 illustrates a schematic representation of item price computation system according to an embodiment.

FIG. 3 illustrates a schematic representation of a system for determining relevant items to a user according to an embodiment. As a user 101 performs various actions 102 on, for example, an e-commerce platform using the client device 100, an action history comprising these actions 102 can be saved into a user profile 210. An action 102 may be, for example, an item purchase, viewing an item, placing an item into a shopping cart, or an item review. The user profile 210 can be stored, for example, in the memory of the computing apparatus 200. Item information database 220 can also be stored, for example, to the memory of the computing apparatus 200. Herein, any information/data that may be stored to the memory of the computing apparatus 200 may also be stored in some other manner, for example, to an external database. The item information database 220 can be obtained and/or updated from, for example, external data 221 or by inputting data 222. The external data 221 may be provided, for example, by a manufacturer of an item. The item information database 220 can comprise information about plurality of items, and each item can be associated with various attributes.

An attribute may describe any property or characteristics of an item, such as a food item or a consumer good. A plurality of attributes may be applicable to a single item. An attribute may be common for a plurality of items. An attribute and the value of the attribute can be predetermined. Some embodiments of attributes are described below.

Based on the user profile 210 and the item information database 220, the computing apparatus 200 can execute various computational procedures 230. The outputs of these computational procedures 230 may, for example, indicate how well an item in the item information database 220 fits the preferences of a user 101, how similar an item is with previous actions 102 of a user 101, and/or how relevant an item is to a user 101. The computational procedures 230 can be based on the user profile 210 of the user 101 and the item information database 220. Based on the computational procedures 230, the computing apparatus 200 can determine relevant items 240, and the relevant items 240 can be presented to the user 101 through the client device 100. For example, the client device 100 can present relevant items 240 to the user 101 using a user interface, UI. According to an embodiment, the computation procedures 230 may calculate a similarity score 232 for each item in the item information database 220, wherein the similarity score 232 can indicate how well the item fits to the user profile 210. Based on the similarity score 232, the computing apparatus 200 can determine relevant items for the user 101, for example by ranking/ordering the items in the item information database 220 according to their similarity scores 232.

Figure 4:
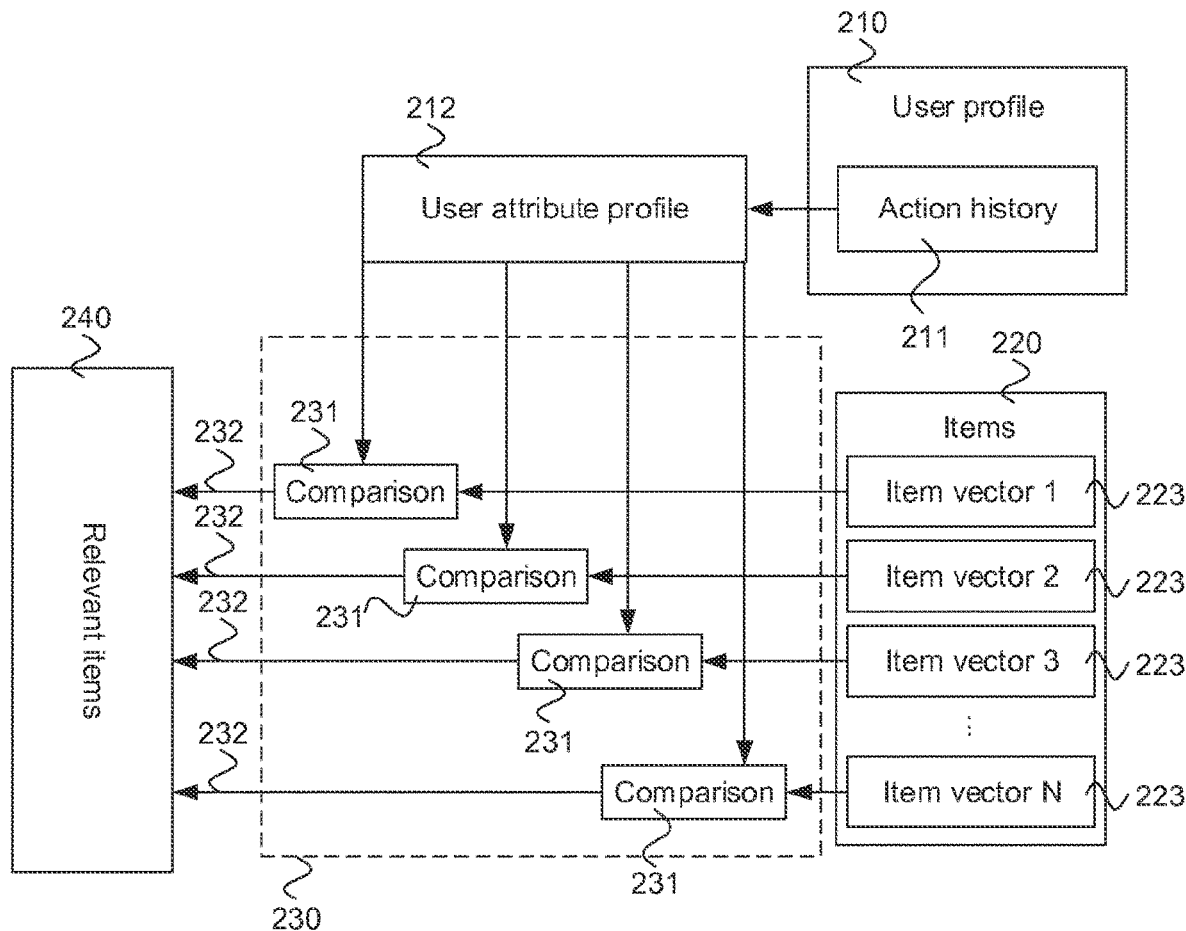
FIG. 4 illustrates a schematic representation of item price calculation system according to an embodiment.

FIG. 4 illustrates a schematic representation of relevance computation procedures 230 according to an embodiment. Based on an action history 221 stored in the user profile 210, a user attribute profile 212 can be computed. For example, the computing apparatus 200 may use the item attribute vectors 223 of the item indicated by the action history 211 to calculate the user attribute profile 212. Herein, an attribute may refer to a property of an item that can be assigned, for example, a numerical value. For example, a food item can be gluten free. This can be indicated by assigning a binary value 1 to a "gluten free" attribute of that item, wherein the value 1 may indicate a logical true. On the other hand, if an item is not gluten free, this field can be assigned value 0, wherein the value 0 may indicate a logical false. Alternatively, a similar attribute may be indicated by a "contains gluten" attribute. Only one of the attributes "gluten free" and "contains gluten" is needed for an item, since these attributes can indicate the same information. It should be appreciated that the term "gluten free" itself does not need to be saved to indicate that an item is gluten free. Instead a certain field of each item in the item information database 220 may be assigned to represent the attribute "gluten free", and only number of the field, for example, may be used. The number of a field may also be referred to as an attribute identification, ID. The user attribute profile 212 may indicate which item attributes are important to the user 101 based on the action history 211 of the user 101. For example, if the user 101 purchases large amounts of gluten free items, the user attribute profile 212 may reflect this. Additionally, the user attribute profile 212 may indicate that the user 101 purchases large amount of gluten free items only in some item category. This may also be taken into account. The user attribute profile 212 may also be referred to as a user attribute profile vector. The fields of the user attribute profile vector 212 may comprise the values of different attributes. If a user 101 has not purchased any items, other information about the user 101, such as items that the user 101 may have placed in a shopping cart, may be used instead of the action history 211. According to an embodiment, the action history 211 comprises a purchase history of the user 101.

According to an embodiment, the item information database 220 may comprise a plurality of item attribute vectors 223, wherein each item attribute vector 223 comprises the item attribute values of an item. The item attribute vectors 223 can be compared to the user attribute profile vector 212 by the comparisons operation 231. The comparison operation 231 may, for example, calculate a quantity that indicates how similar or dissimilar an item attribute vector 223 is with respect to the user attribute profile vector 212. This quantity may be referred to as a similarity score 232 or a calculated similarity score. The similarity score 232 may be calculated for each item in the item information database 220. Based on the values of this quantity for each item, relevant items to the user 101 can be determined.

According to another embodiment, the user attribute profile vector 212 does not need to be calculated. Instead, the comparison operation 231 may directly use the action history 211 of the user 101 and an attribute profile vector 212 to calculate a similarity score 232. The similarity score 232 of each item may be saved, for example, into the user profile 210. The similarity scores 232 may be updated, for example, each time the user 101 preforms an action 102, such as makes a purchase.

Figure 5:
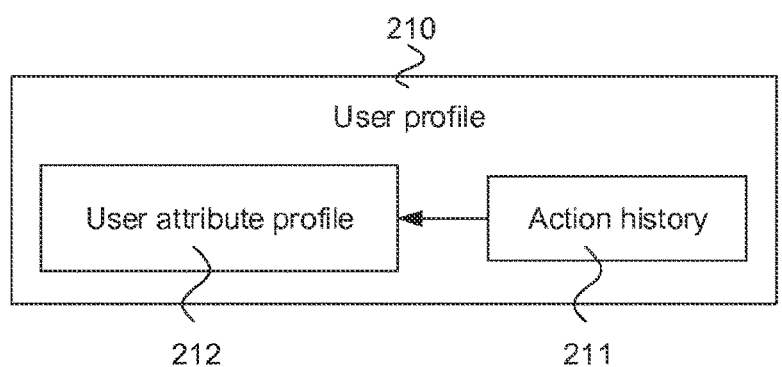
FIG. 5 illustrates a schematic representation of a user profile according to an embodiment.

FIG. 5 illustrates a schematic representation of the user profile 210 according to another embodiment. In this embodiment, the user profile 210 also comprises the user attribute profile 212 in addition to the action history 211. The computing apparatus 200 can be configured to store the user attribute profile vector 212 in the user profile 210 of the user 101. Since the user attribute profile 212 is stored in the user profile 210, the user attribute profile 212 does not need to be computed every time relevant items are determined for the user 101. Instead, the user attribute profile 212 may be updated, for example, every time the user 101 performs an action and the action history 211 is updated. This may reduce the total amount of computations needed, for example, in cases where the user 101 performs actions less often than relevant items are determined for the user 101. Alternatively, if other actions of the user 101, such as viewing an item, affect the user attribute profile 212, the user attribute profile 212 may be updated each time the user 101 performs such an action. Alternative or in addition to this, the user attribute profile 212 may be updated periodically.

According to an embodiment, attributes that are applicable to an item can be indicated by the item attribute vector of the item. FIG. 5-FIG. 8 illustrates schematic representations of item attribute vectors illustrating the relevance and utilisation of attributes for different items in some described embodiments.

FIG. 6 illustrates a schematic representation of an item attribute vector 223 according to an embodiment. In this embodiment, the item attribute vector 223 comprises five attributes 224, and the value 225 of each attribute can be either 0 or 1. The values 0 and 1 may indicate logical values false and true, respectively. The number of attributes, name of the attributes, and attribute values presented in this and in the following embodiments are only exemplary.

According to an embodiment, the item attribute vector 223 comprises: a logical true value, indicating that a corresponding attribute is true for the item; and a logical false value, indicating that a corresponding attribute is false for the item.

FIG. 7 illustrates a schematic representation of an item attribute vector 223 of a food item according to an embodiment. In this embodiment, the item attribute vector 223 comprises seven attributes 224, and the values of these attributes 225 indicate whether the attribute is true for this item or not. Furthermore, an identification, ID, 226 is assigned for each attribute 224.

In the case of the food item presented in FIG. 6, the attributes 224 and the corresponding attribute values 225 indicate that the item is organic, low lactose, and vegetarian, and that the item is not lactose free, vegan, gluten free, or does not comprise large amounts of protein. In some embodiments, the name of the attributes 224 does not need to be saved for each item. Instead, the ID 226 of the attribute may be used to indicate the intended attribute. For example, it may be deduced from a separate table that attribute ID 1 corresponds to attribute "organic", attribute ID 2 corresponds to attribute "lactose free" etc.

In some embodiments, the ID 226 does not need to be stored in the item attribute vector 223 either. Instead, only the attribute values 225 may be stored in the item attribute vector 223, and the ordering of the values can indicate the intended attribute. The attributes can be stored, for example, in a separate table, and this single table can be used for the item attribute vectors of all items or for some subset of all items. For example, the attribute vector presented in FIG. 7 may be stored as [1, 0, 1, 0, 1, 0, 0], and a separate table may comprise, for example, the elements [organic, lactose free, low lactose, vegan, vegetarian, gluten free, high protein]. Thus, it can be deduced based on the separate table that the first element of the item attribute vector 223 corresponds to the attribute "organic" etc.

It should also be appreciated that if the attribute values are binary, like is the case for the embodiment of FIG. 6, the bit values may be mapped to, for example, decimal, hexadecimal, ASCII, or Unicode symbols by grouping bits in the item attribute vector 223, and the symbols may be stored in memory.

FIG. 8 illustrates a schematic representation of an item attribute vector 223 of a hygiene item according to an embodiment. Since a hygiene item can be different from a food item in various ways, the item attribute vector 223 of a hygiene item can comprise different attributes 224 compared to a food item. For example, as is illustrated in FIG. 7, an item attribute vector 223 for a hygiene item may comprise, for example, attributes that indicate that the item is suitable for dry or sensitive skin or certain allergies. The attributes of a food item may also relate to an allergy, but the allergies of a hygiene item may be different from a food item. Similarly, different attributes may be applicable for different food items. Herein, comparisons between the attributes of food items and hygiene item are intended to illustrate various attributes and different attributes of different items. It should be appreciated that there can also be significant differences between the attributes of different food items etc.

A hygiene item may also have common attributes with food item. Such attributes may be, as illustrated in FIG. 7, the item being organic or vegan. In the embodiments of FIG. 6 and FIG. 7, only attributes that are applicable to the item in question are illustrated. It should be appreciated that all attributes may be stored for all items or only the applicable attributes may be stored for each item. Applicable attributes for an item may be determined, for example, using an item tree. Each item may be part of a node of an item tree, and applicable attributes can be determined based on the node. A item tree may be, for example, any structure that groups and/or classifies items. For example, nodes of an item tree may correspond to item categories and subcategories. The item tree may also indicate, for example, different uses of items. Applicable attributes may be determined based on nodes of the item tree. For example, a list of applicable attributes may be determined for an item category so that those attributes are applicable for all items in that category. If an attribute is related to some ingredient that is common for an item category, that attribute may be applicable for the whole item category. Some attributes may be applicable for all items. The use of an item may also determine applicable attributes. For example, "contains milk" may be applicable attribute for plant-based drinks, such as soy milk, due to their probable use as milk replacements.

FIG. 9 illustrates a schematic representation of an item attribute vector 223 for a hygiene item according to an embodiment. In this embodiment, also attributes that are not applicable for a hygiene item are presented in the item attribute vector 223. The attributes that are not applicable for the hygiene item of FIG. 8 are indicated by a special value not available, n/a, 225'. Any special value that can be unambiguously distinguished from valid values may be used to indicate that an attribute is not applicable for a certain item. Since in the embodiment of FIG. 8, 0 and 1 are used as valid values, for example, −1 or not a number, NaN, may be used to indicate that an attribute is not applicable to an item. This may be useful in the storing of the item attribute vector 223, because the attribute 224 or the attribute ID 226 may not be need to be stored in/with the item attribute vector 223. Instead, the ordering of the attribute values 225, 225' may be used to indicate which attribute is in question, and the same ordering can be used between different items and item categories that may have different applicable attributes.

For example, if the item attribute vector 223 comprises only the applicable attributes, the food item of FIG. 6 could be represented by the vector [1, 0, 1, 0, 1, 0, 0] and the hygiene item of FIG. 7 could be represented by the vector [1, 0, 1, 0, 1]. Since these vectors refer to, at least partly, different attributes, these vectors may not be easily comparable. Therefore, a separate table may be needed for both item categories to indicate the corresponding attributes. On the other hand, if the item attribute vector 223 also comprises the non-applicable attributes, the food item of FIG. 6 could be represented by the vector [1, 0, 1, 0, 1, 0, 0, n/a, n/a, n/a] and the hygiene item of FIG. 8 could be represented by the vector [1, n/a, n/a, 0, n/a, n/a, n/a, 1, 0, 1]. Since these representations use the same indexing, the items are comparable and correspondence of the indexing with the attributes can be stored into, for example, a single table for all items and item categories. In some embodiments, different indexing may be used for different item groups, and there may be a correspondence table between indices and attributes for each item group.

As is described in the embodiments herein, the item attribute vector 223 may indicate the attributes applicable for the item in various ways. For example, the item attribute vector of an item may only comprise attribute values for attributes that are applicable to the item. An example of this may be the embodiment of FIG. 8. Alternatively or additionally, the item attribute vector 223 may comprise a special attribute value for attributes that are not applicable to the item. Thus, attributes that are not marked with such a special value may be applicable to the item. An example of this may be the embodiment of FIG. 9. These are only examples and the item attribute vector 223 may also indicate the applicable attribute values in various different ways. For example, the item attribute vector 223 may comprise other fields that may indicate whether an attribute is applicable for the item or not.

FIG. 10 illustrates a schematic representation of a user action history 211 according to an embodiment. In this embodiment, the action history 211 comprises purchases. Other types of actions may be represented in a similar fashion in the action history 211. In such embodiments, the type of the action, such as purchase, view, or review, may also be stored into the user action history 211. Alternatively, different types of actions may be stored into different tables in the user action history 211. For each item that the user 101 has purchased, an item ID 901 and the number of items purchased 902 can be stored into the user action history 211. In other embodiments, only the IDs 901 of the purchased items may be stored into the user action history 211, and if the same item has been purchased multiple times, the ID 901 is stored as many times as the item has been purchased. In such embodiments, the number of purchases 902 does not need to be stored, and the user action history 211 may comprise only a vector of item IDs 901. Also other information about the items may be stored to the user action history 211. The amount of data stored in the user action history 211 may vary depending on, for example, the user 101 and the items that the user 101 has purchased.

FIG. 11 illustrates a schematic representation of a user attribute profile vector 212 according to an embodiment. In this embodiment, the user attribute profile vector 212 comprises five attributes 224, corresponding IDs 226, and attribute values 213. This is only exemplary and the number of attributes stored in the user attribute profile vector 212 can vary. Each attribute ID 226 corresponds to an attribute 224. The attribute 224 itself does not need to be stored in the user attribute profile vector 212, if the corresponding ID 226 is stored in the user attribute profile vector 212. In the following, the attributes 224 are presented in the figures for illustrative purposes. For each attribute ID 226, the user attribute profile vector 212 comprises a corresponding attribute value 213. The attribute value 213 may describe how well the corresponding attribute fits the action history 211 of the user 101. For example, an attribute value 213 close to 1 for an attribute may indicate that the user has purchased large amounts of items the item attribute vectors 223 of which comprise value 1 for that attribute. Alternatively or in addition to this, the user 101 may have performed other actions related to such items. Therefore, the attribute may be important to the user 101, and it may be beneficial to display items that comprise that attribute value set to 1, since these items may be more relevant for the user 101. On the other hand, attribute values 213 close to 0 may indicate the opposite. The opposite may also be true; a value 213 close to 0 may indicate that the user 101 has purchased large amounts of items that comprise that values set to 1 and vice versa. In the embodiment of FIG. 11, the attribute values 213 may comprise any value between 0 and 1. In other embodiments, the values 213 may be scaled to a different interval, such as from 0 to 100.

According to an embodiment, each attribute value in the user attribute profile vector 211 is in range of 0 to 1.

FIG. 12 illustrates a schematic representation of a user attribute profile vector 212 according to another embodiment. This embodiment is similar to that presented in FIG. 11 except that this embodiment comprises exemplary attributes 224, attribute IDs 226, and attribute values 213. In this embodiment, the value of an attribute corresponding to attribute ID 7, which indicates high protein content in an item, is 0.72. This may indicate that the user 101 has previously performed large amounts of actions related to items that have a high protein content. For example, the user 101 may have purchased large amounts of such items. Therefore, high protein content items may be relevant to the user 101, and it may be beneficial to display high protein content items to the user. On the opposite end of the spectrum, the user 101 may have performed only a small number of actions related to lactose free items, since the value of this attribute is only 0.01 in the user attribute profile 212 presented in FIG. 12. Therefore, it may be beneficial not to display lactose free items to the user 101 in the future, since these items may not be relevant to the user 101.

It should be appreciated that the conclusion presented above with respect to the embodiment of FIG. 12 are based only on the value of a single attribute. In order to determine relevant items to the user 101, it may be beneficial to take into account more attributes than one. It may be beneficial to take into account all attributes applicable for each item. For example, in the embodiment of FIG. 12, if an item is both high in protein and lactose free, it may still be beneficial to display that item to the user 101.

According to an embodiment, the item attribute vector for an item with item ID i may be represented in the following fashion $$P_i = [\{0,1\},\{0,1\},\ldots,\{0,1\}],$$

where the elements in the vector $P_i$ refer to the different attributes of the item i, where i may be an integer. Here, $\{0,1\}$ indicates that each element of the vectors $P_i$ may be either 0 or 1. For example, an item vector for some item may be $P_i=[0, 0, 1, 0]$, where each element of the vector $P_i$ refers to the attribute of the corresponding index. The first element may refer, for example, to the item being organic, the second element may refer to the item being lactose free, the third element may refer to the item being low lactose, and the fourth element may refer to the item being vegan. Thus, in the example above, the item contains low amounts of lactose, but is not lactose free, organic, or vegan.

According to an embodiment, a user attribute profile vector 212 for a user with user ID k can be computed in the following way $$U_k = \left[ \frac{\sum_{i|1|k} P_i[1]}{n_{k|1}}, \frac{\sum_{i|2|k} P_i[2]}{n_{k|2}}, \ldots, \frac{\sum_{i|N|k} P_i[N]}{n_{k|N}} \right].$$

$P_i[j]$ refers to the jth element of the item attribute vector $P_i$. The sum over i|j|k represents summing over all items i that the user k has purchased and for which the attribute j is applicable, and $n_{k|j}$ is the total number of items the user k has purchased for which the attribute j is applicable. N is the length of the user attribute profile vector $U_k$. N may be, for example, the total number of attributes. Alternatively, each element corresponding to index j in the user attribute profile vector $U_k$ can be represented as $$U_k[j] = \frac{\sum_{i|j|k} P_i[j]}{n_{k|j}}.$$

In other embodiments, other actions 102 may be taken into account in a similar manner when calculating the user attribute profile vector 212. In such embodiments, different weighting factors may be used for different types of actions. For example, purchase of an item may be considered to be more significant than viewing an item, and therefore purchases may be weighted more than viewings.

Figure 13:
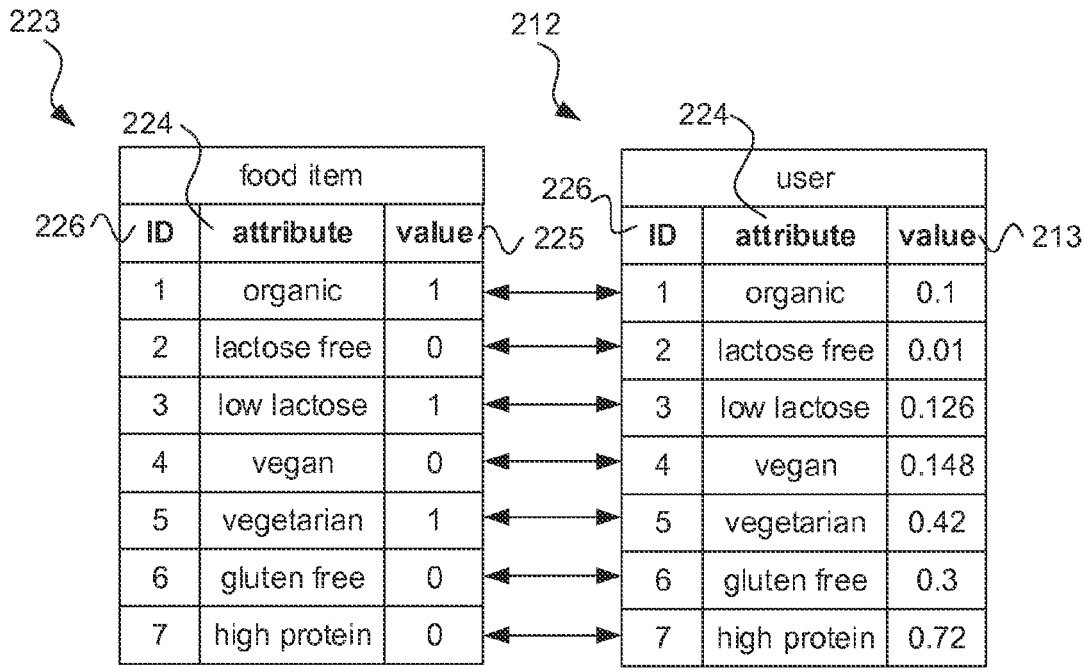
FIG. 13 illustrates a schematic representation of a comparison of an item attribute vector and a user attribute profile vector according to an embodiment.

FIG. 13 illustrates a schematic representation of comparison of an item attribute vector 223 and a user attribute profile vector 212. As can be seen from the embodiment of FIG. 13, the computing apparatus 200 may compare corresponding attribute values of the item attribute vector 223 and the user attribute profile vector 212.

According to an embodiment, the computing apparatus 200 is configured to calculate the similarity score 232 by comparing corresponding attribute values in the attribute profile vector 212 and in the item attribute vector 223. The comparison can be done, for example, by subtracting the corresponding attribute values and taking the absolute value: $|P_i[j]-U_k[j]|$.

According to an embodiment, a similarity score 232 $D_{i,k}$ between an item attribute vector $P_i$ and a user attribute profile vector $U_k$ can be calculated in the following way $$D_{i,k} = \frac{\sum_{j|i} |P_i[j] - U_k[j]|}{n_{j|i}},$$

where summation over j|i is a summation over all attributes j applicable to the item i, and $n_{j|i}$ is the total number of attributes applicable to the item i. ∥ is the absolute value, which may also be referred to as modulus. Thus, the similarity score 232 $D_{i,k}$ may quantify how similar the item i is to the previous actions 102 of the user k. If the equation above is used to calculate the similarity score 232 $D_{i,k}$, the value of $D_{i,k}$ may be between 0 and 1, where a lower value indicates a higher similarity. For example, if the corresponding attribute values in the item attribute vector $P_1$ and in the user attribute profile vector $U_k$ are equal, all of the $P_i[j]-U_k[j]$ terms in the equation above are zero. Therefore, in such a case, the value of $D_{i,k}$ is zero. In other embodiments, different procedures may be used to calculate the similarity between an item attribute vector 223 and a user attribute profile vector 212.

According to another embodiment, the value of an attribute can be non-binary. For example, the value of an attribute may reflect a property of an item on a continuous measurement scale. The value X of such attribute can be normalised to be between 0 and 1, for example, in the following fashion:

$$X^n = \frac{X - \min(X)}{\max(X) - \min(X)},$$

where $X^n$ is a normalised value of the attribute value X. Here, min(X) refers to the minimum possible value of X, and max(X) refers to the maximum possible value of X. For example, if X refers to the amount of protein per 100 grams of an item, min(X)=0g and max(X)=100 g. If an item then comprises 10 g of protein per 100 g, X=10, and $X^n$=0.1. The limits min(X) and max(X) may also be chosen in other ways. For example, max(X) may be chosen to reflect a realistic maximum value. In the example presented above, max(X) may be lower than 100 g, since it may be difficult to find an item with such high protein content. The value of max(X) may be determined, for example, by considering all items and finding an item that has the highest value of X.

According to another embodiment, a non-binary attribute value may be a category value. Such attribute value may be decomposed into a set of m binary attribute values in the item attribute vector 223 and in the user attribute profile 212. For example, an item may belong to one of three different groups $X_1$, $X_2$, $X_3$, and a non-binary attribute may indicate which group the item belongs to. This may be decomposed into three binary attributes, where each attribute may be of the form "part of group X". For example, if an item belongs to group $X_2$, values of the attributes "part of group $X_1$" and "part of group $X_3$" could be 0, while the value of the attribute "part of group $X_2$" could be 1. Since a single non-binary category attribute may be decomposed into multiple binary attributes, the effect of this non-binary attribute may be over emphasised when calculating the similarity score $D_{i,k}$. To mitigate this, the similarity score may be calculated in the following way so that the weight of a non-binary category attribute is, for example, equal to binary attributes:

$$D_{i,k} = \frac{\sum_{j|i}\left(\sum_m \frac{1}{m-1}|P_i[j] - U_k[j]|\right)}{n_{j|i}}.$$

In addition taking into account the similarity score $D_{i,k}$ between an item and a user 101, also the action history 211 of the user 101 may be taken into account in the assessment of which items may be relevant to a user 101. According to an embodiment, the computing apparatus 200 is further configured to calculate an ordering score for each item in the plurality of items based on a location of the item and locations of previously purchased items by the user in an item tree. The computing apparatus 200 may be further configured to order the plurality of items using the ordering score of each item and the similarity score 232 of each item.

Ordering score $M_{i,k}$ between an item i and a user k may be calculated, for example, in the following way:

$$M_{i,k} = \begin{cases} wD_{i,k} + (1-w)\dfrac{\max(R_{i,k})}{R_{i,k}} \times \min_{R_{i,k}>0}(R_{i,k}), & R_{i,k} > 0 \\ wD_{i,k} + (1-w)\max(R_{i,k}), & R_{i,k} = 0 \end{cases}.$$

where $D_{i,k}$ can be the calculated similarity score 232 described above. w is a weight factor which can be configured to emphasise the similarity score $D_{i,k}$ or the following term. $R_{i,k}=N_i/N$, where N is the total number of purchases by the user k, and $N_i$ is the number of purchases done by the user k in a node of an item tree that comprises the item i. In other embodiments, other action 102 may also be taken into account. $\max(R_{i,k})$ is the maximum of this quantity for the user k, and $$\min_{R_{i,k}>0}(R_{i,k})$$

is the non-zero minimum of this quantity for the user k. Alternatively, $N_i$ and N may refer to the value, volume, margin, or revenue of the aforementioned items. Furthermore, the calculations presented above may be performed for some time interval, so that only purchases during that time interval are taken into account.

For example, the similarity score 232 of the food item attribute vector 223 of FIG. 7 and the user attribute profile 212 of FIG. 11 can be computed with the equations described above. A visualisation of the comparison is illustrated in the embodiment of FIG. 12. If it is assumed that all applicable attributes of the food item of FIG. 7 are presented in the item attribute vector 223 of FIG. 7, the total number of attributes applicable to the food item is 7. Therefore, for this example, the similarity score 232 can be calculated to be $$D_{i,k}=(|1-0.1|+|0-0.01|+|1-0.126|+|0-0.148|+|1-0.42|+|0-0.3|+|0-0.72|)/7 \approx 0.505.$$

If the attribute corresponding to attribute ID 7 in FIG. 7, indicating high protein content of the food item, is switched to 1 in the item attribute vector 223 and other attributes are kept as presented in FIG. 7, the value of the similarity score 232 $D_{i,k}$ changes to approximately 0.442. This indicates that an item with a high protein content is more similar to the previous actions of the user profile 212 presented in FIG. 11 than an otherwise similar item with a low protein content, because 0.442<0.505. Therefore, it may be beneficial to prefer items that comprise a high protein content rather than otherwise similar items that comprise low protein content when items are displayed to the user 101. However, it should be appreciated that the values of other attributes also affect which items should be displayed to the user 101.

Based on the similarity score 232, the computing apparatus 200 may decide which items to display to the user 101 and, for example, in which order. According to an embodiment, the computing apparatus 200 may calculate a similarity score 232 for each item in a subset of all items and display the items with the highest similarity. Alternatively, the computing apparatus 200 may choose the displayed items randomly from the similarity score distribution using, for example, some preconfigured statistical distribution. According to another embodiment, the computing apparatus 200 may calculate a similarity score 232 for an item and display the item to the user 101, if the similarity score is within some preconfigured limits. This may be repeated, for example, until a preconfigured number of displayed items is chosen. According to another embodiment, the computing apparatus 200 may calculate a similarity score 232 for each item in a plurality of items and order the items in the plurality of items according to the similarity scores 232. This may be applied, for example, to search results.

Figure 14:
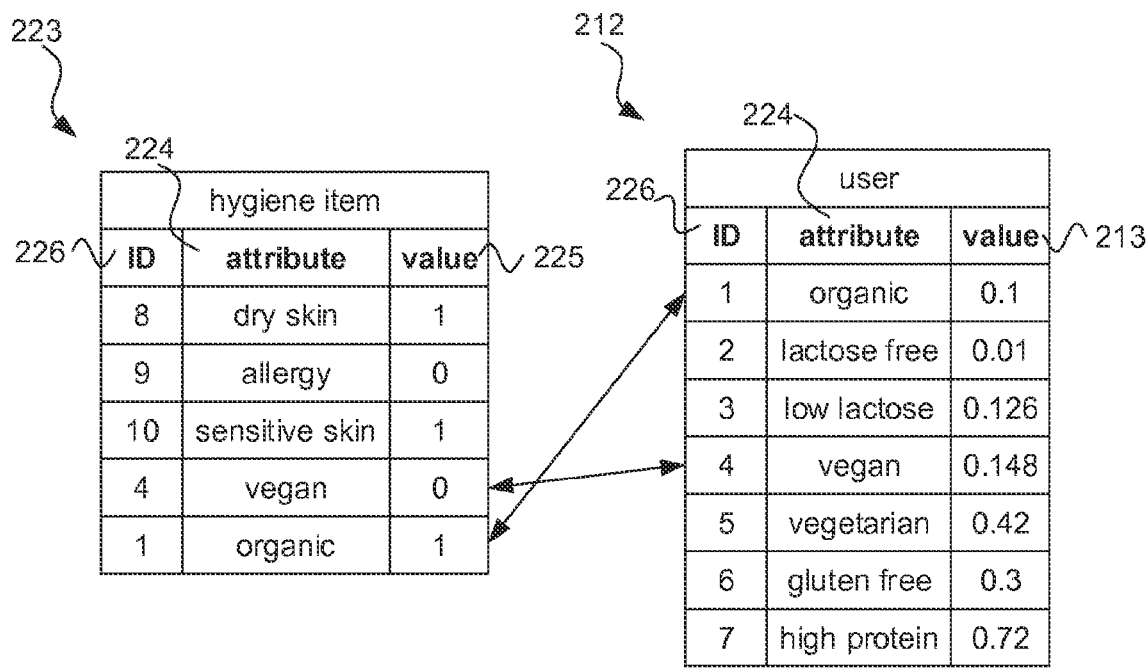
FIG. 14 illustrates a schematic representation of a comparison of an item attribute vector and a user attribute profile vector according to another embodiment.

FIG. 14 illustrates a schematic representation of comparison of an item attribute vector 223 and a user attribute profile vector 212 according to another embodiment. In the embodiment of FIG. 14, the item attribute vector 223 may comprise attributes applicable to a hygiene item. The item attribute vector 223 and the user attribute profile vector 212 may comprise a lower number of corresponding attribute values than in the embodiment of FIG. 14.

According to an embodiment, the computing apparatus 200 is configured to store each similarity score 232 in the user profile 210. The similarity scores 232 between user profiles 210 and item attribute vectors 223 may be pre-calculated for all users 101 or for some subset of all users 101. If the similarity scores 232 are pre-calculated for a user 101, these similarity scores 232 may be updated, for example, each time the user 101 performs an action 102. The pre-calculated similarity scores 232 may be stored in the user profile 210 or, for example, in a separate database. Alternatively or in addition to this, the similarity scores 232 may be calculated on-demand. For example, each time the similarity scores 232 of a user 101 are needed, the similarity scores 232 can be calculated again. The similarity scores 232 may be pre-calculated for some users, while the similarity scores 232 may be calculated on-demand for other users.

According to an embodiment, "high similarity" may refer to cases where an item attribute vector 223 and a user attribute profile 212 are similar. "Low similarity" may refer to cases where an item attribute vector 223 and a user attribute profile 212 are not similar. This similarity may be based on the similarity score 232. However, these terms are used independent of the details how the similarity score is calculated are do not necessarily describe the value of the similarity score 232. For example, when the similarity score 232 is calculated using the equations presented above, a low similarity score 232, for example close to zero, may indicate a high similarity and vice versa. The exact limits for high and low similarity may vary.

Figure 15:
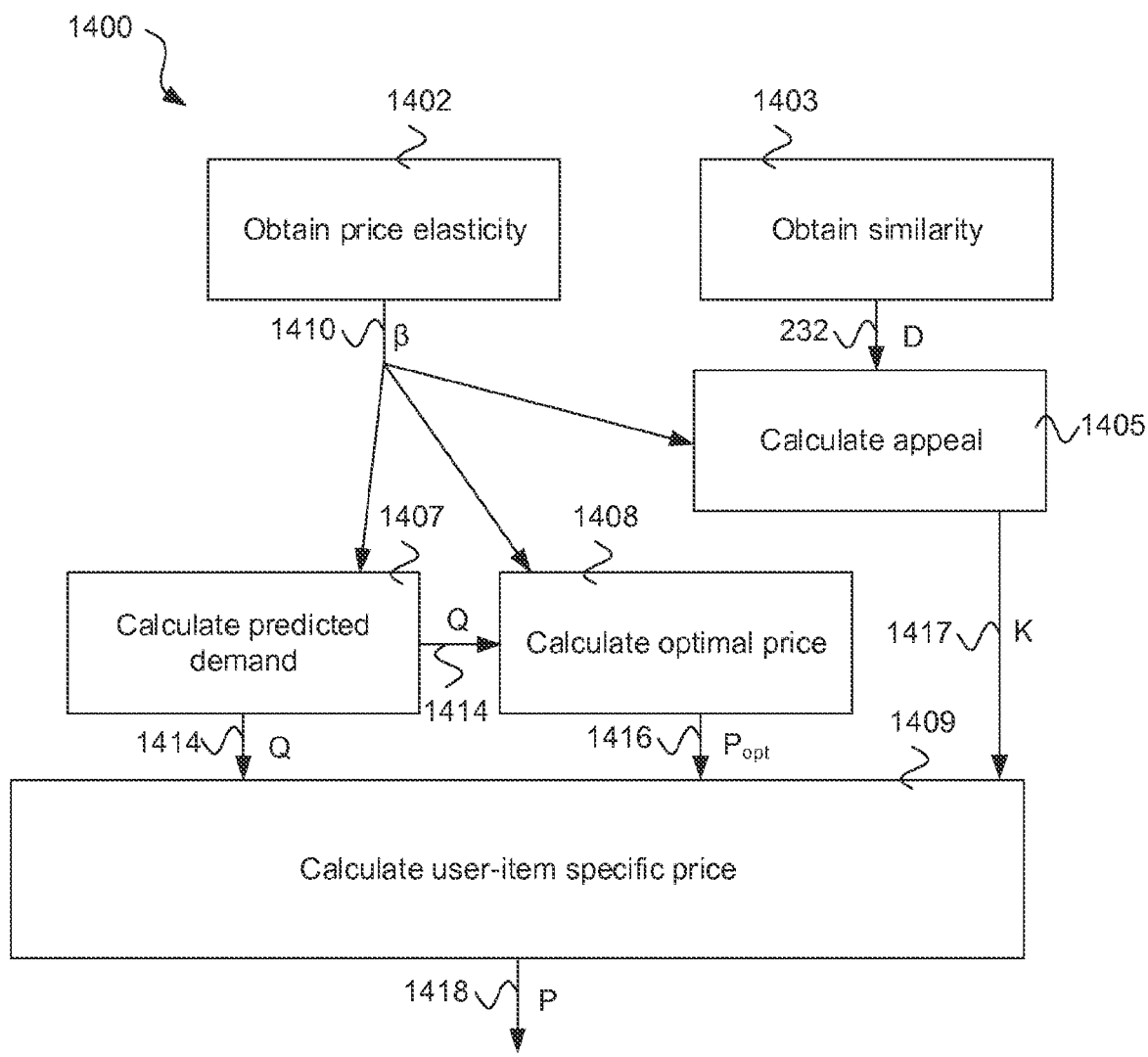
FIG. 15 illustrates a schematic representation of user-item specific price calculation according to an embodiment.

FIG. 15 illustrates a flow chart 1400 representation of user-item specific price calculation according to an embodiment. The procedure 1400 may be performed by, for example, the computing apparatus 200. Alternatively or additionally, different operations of the procedure 1400 may be performed by different devices.

User-item specific price may refer to a price that is specific to a certain user-item pair. Alternatively or additionally, user-item specific price may be referred to as a user-specific price of an item.

According to an embodiment, the computing apparatus 200 comprises at least one processor and at least one memory including computer program code, the at least one memory and the computer program code configured to, with the at least one processor, cause the computing apparatus to: calculate a similarity score 232 between a user attribute profile vector of a user and an item attribute vector of an item by comparing corresponding attribute values in the attribute profile vector and in the item attribute vector; obtain a price elasticity 1410; calculate an appeal score 1417 based on the similarity score and the price elasticity; and calculate a user-specific price 1418 for the item based at least on the appeal score and the price elasticity.

When the computing apparatus 200 calculates the user-specific price for the item, the computing apparatus 200 may perform other operations, such as those disclosed herein, based on the appeal score and/or the price elasticity. These operations may produce other quantities, such as those disclosed herein, and the computing apparatus 200 may calculate the user-specific price 1418 for the item based on these quantities and/or the appeal score and/or the price elasticity. Thus, when the computing apparatus 200 calculates the user-specific price for the item, this may involve any number of computation/calculations. Some examples of what these calculations may involve are disclosed in the embodiments herein.

In operation 1402, price elasticity f 1410 can be obtained. Price elasticity $\beta$ 1410 may also be referred to as the price elasticity of demand. The price elasticity $\beta$ 1410 may be calculated based on, for example, the action history 211 of the user 101. The price elasticity $\beta$ 1410 may be calculated using, for example, any procedure described herein. The price elasticity $\beta$ 1410 may be calculated by, for example, the computing apparatus 200. Alternatively, some other device may calculate the price elasticity $\beta$ 1410 and provide the price elasticity $\beta$ 1410 to, for example, the computing apparatus 200. For example, the device may calculate the price elasticity $\beta$ 1410 and save it to a memory, and the computing apparatus 200 may obtain the price elasticity $\beta$ 1410 from the memory. The computing apparatus 200 may perform other operations, such as calculations, based on the price elasticity $\beta$ 1410.

According to an embodiment, the at least one memory 202 and the computer program code are configured to, with the at least one processor 201, cause the computing apparatus 200 to calculate the price elasticity 1410 based on an action history 211 of the user. The computing apparatus 200 may, for example, obtain the action history 211 from the memory 202 or some other storage medium.

Price elasticity 1410 can be calculated in an iterative manner on, for example, on the following levels:
1. User-item specific price elasticity
2. Item specific price elasticity
3. User—item hierarchy—attribute specific price elasticity
4. Item hierarchy—attribute specific price elasticity
5. Item hierarchy level price elasticity If sufficient data is not available for estimating the price elasticity reliably on a certain level, the price elasticity can be estimated on a coarser level. For example, if sufficient data is not available to calculate a user-item specific price elasticity, an item specific price elasticity may be calculated and so on.

Price elasticity $\beta$ 1410 can be defined as $$\beta = \frac{\Delta Q/Q}{\Delta P/P} = \frac{dQ}{dP} \times \frac{P}{Q} = \frac{d\log Q}{d\log P},$$

where Q is the demand at price P. Thus $$Q\beta = \frac{dQ}{d\log P},$$

and integration gives $$Q = Q^0 \left(\frac{P}{P^0}\right)^\beta,$$

where $Q^0$ is the original demand at original price $P^0$. This can be also expressed in the form $$Q = Q^0 e^{\beta r}$$

where r=log P–log $P^0$.

Cross-price elasticity $\gamma$ for an item pair t can be determined from $$Q = Q^0 e^{\beta r} \times Q_t^0 e^{\gamma r_t},$$

where $r = \log P - \log P^0$ and $r_t = \log P_t - \log P_t^0$.

Figure 16:
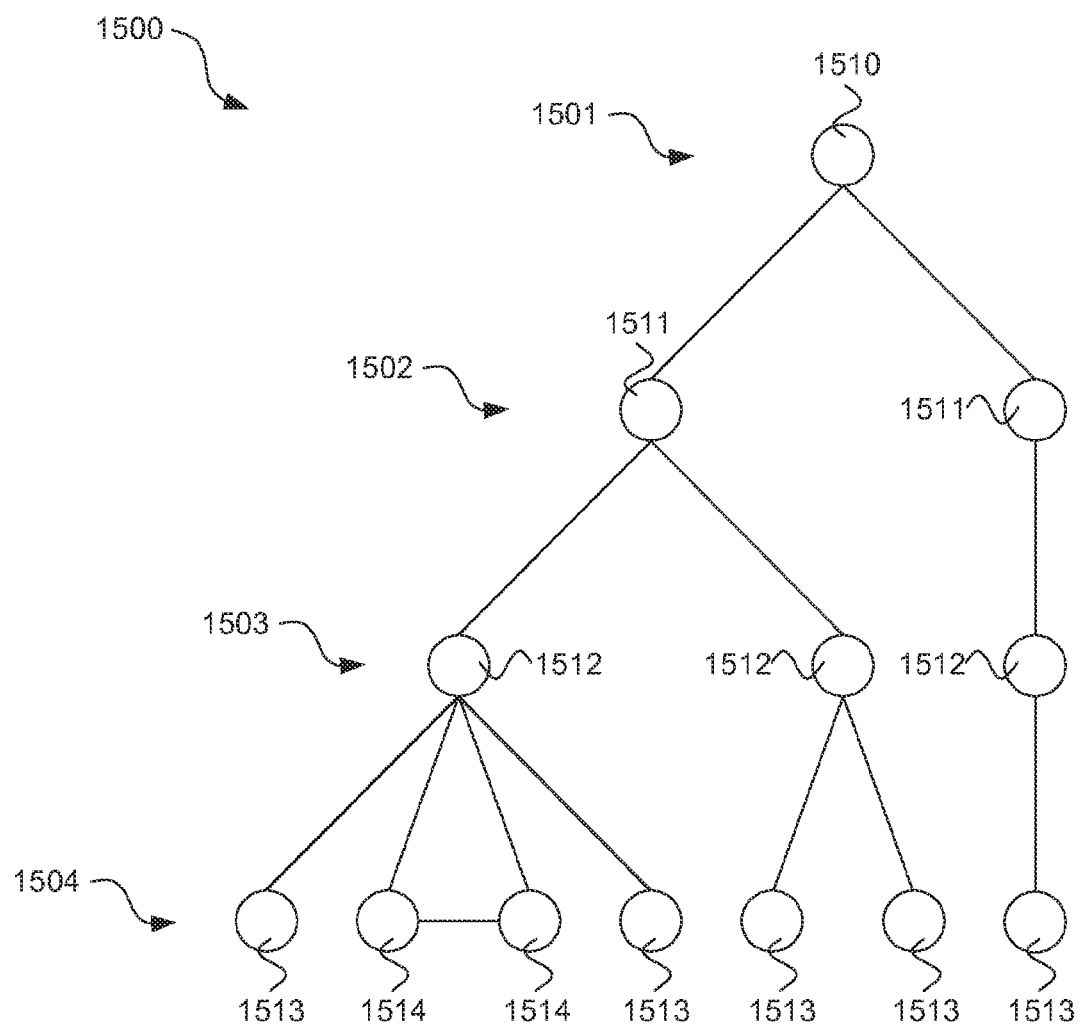
FIG. 16 illustrates a schematic representation of a user tree according to an embodiment.

FIG. 16 illustrates a schematic representation of a user tree 1500 according to an embodiment. The price elasticity β 1410 may be calculated based on the user tree 1500.

A user level 1501 of the user tree 1500 may comprise a user node 1510. A first item level 1502 of the user tree 1500 may comprise group nodes 1511. The group nodes 1511 may correspond to higher level item groups. A second item level 1503 of the user tree 1500 may comprise further group nodes 1512. The group nodes 1512 may correspond to item groups. The item groups may be based on an item tree and/or applicable item attributes. The user tree 1500 may comprise any number of group levels and the two group levels 1502, 1503 are only examples.

The user tree 1500 may further comprise an item level 1504. The item level 1504 may comprise item nodes 1513, 1514. The item nodes 1513, 1514 may correspond to items. Some item nodes may be paired item nodes 1514. Paired item nodes 1514 may correspond to, for example, competing items. Cross-price elasticity may be calculated for paired items 1514. Price elasticity may be calculated for each item. This may be referred to as item-level price elasticity. Price elasticity may also be calculated on item group level 1502, 1503. If a user-item pair does not have sufficient data to estimate the price elasticity for the user-item pair, a coarser level price elasticity on any level of the user tree 1500 may be calculated.

In operation 1403, similarity score D 232 can be obtained between a user and an item. The similarity score 232 may be calculated using, for example, any procedure described herein. The similarity score 232 may be calculate by, for example, the computing apparatus 200. Alternatively, some other device may calculate the similarity score 232 and provide the similarity score 232 to, for example, the computing apparatus 200. The computing apparatus 200 may perform other operations, such as calculations, based on the similarity score 232.

In operation 1405, an appeal score 1417 can be calculated for a user-item pair.

According to an embodiment, the at least one memory 202 and the computer program code are configured to, with the at least one processor 201, cause the computing apparatus to: calculate the appeal score 1417 using a product comprising the similarity score 232 and the price elasticity 1410. In some embodiments, the product may also comprise other quantities and/or operations on these quantities. For example, the product may comprise an absolute value of the similarity score 232, of the price elasticity 1410, and/or of other quantities.

The appeal score 1417 can be calculated for a plurality of items. The appeal score 1417 may also be referred to as a user-item appeal score. The appeal score $K_{ij}$ 1417 for user i and item j can be calculated using, for example, a product comprising the price elasticity $\beta_{ij}$ 1410 and the similarity score $D_{ij}$ 232:

$$K_{ij} = |\beta_{ij}| \times (1 - D_{ij}).$$

Based on the appeal score $K_{ij}$ 1417, items j can be ordered for a user i. The order may be, for example, an ascending order. The order can be used in, for example, calculating user specific prices for items.

In operation 1407, a predicted demand Q 1414 can be calculated. The predicted demand Q 1414 may be calculated for a user-item pair. The predicted demand Q 1414 can be calculated using, for example, previous sales in a given time window. Alternatively or additionally, the predicted demand Q 1414 may be calculated using pervious sales in a given time window on different levels of the item hierarchy and by allocating the total sales of a level in the item hierarchy to items on that level. Alternatively or additionally, the predicted demand Q 1414 may be calculated by calculating a user-item specific time series based demand for each item, or by calculating user-item specific time series based demand.

In operation 1408, a price of optimal margin 1416 can be calculated. For calculating the price of optimal margin 1416, an acceptable price range can first be defined for each item. The acceptable price range can be determined, for example, based on how much the price can deviate from a list price. The searching of price of optimal margin 1416 can then be limited to the acceptable price range.

Margin K can be calculated from $$K = Q \times (P - P_p),$$

where $P_p$ is the purchase price of the item and P is the price of the item. Optimal margin $K_{opt}$ can be defined to be a maximum margin within the acceptable price range. The price of optimal margin $P_{opt}$ can be found by finding the optimal margin $K_{opt}$. The optimal margin $K_{opt}$ can be found by, for example, testing all possible prices P in the acceptable price range or by using some other optimisation procedure.

Alternatively or additionally, the price of optimal margin $P_{opt}$ 1416 can be calculated using:

$$P_{opt} = P_p \times \frac{\beta}{\beta + 1}.$$

This may be used, for example, when the acceptable price range is not defined. Furthermore, $P_{opt}$ can be limited to be greater or equal to $P_p$.

It should be appreciated that the price of optimal margin 1416 obtained using the procedure described above does not need to correspond to a global maximum of the margin. Instead, the price of optimal margin may, for example, maximise the margin within the acceptable price range and/or with sufficient accuracy.

In operation 1409, the user-item specific price 1418 may be calculated. Based on the appeals score K 1417, items can be ordered according to their appeals to the user. Based on the ordering, a user-item specific price 1418 may be calculated for most appealing items. The number of items for which the user-item specific price 1418 is calculated may be preconfigured. For example, the user-item specific price 1418 may be calculated for ten most appealing items according to the appeal score K 1417. Alternatively, the number of items for which the user-item specific price 1418 is calculated may be determined in some other manner. For the items for which the user-item specific price P 1418, the user-item specific price P 1418 may be set to be equal to the price of optimal margin $P_{opt}$ 1416. Alternatively, the user-item specific price 1418 may be calculated in some other manner, such as using procedures disclosed herein.

According to an embodiment, the at least one memory and the computer program code are configured to, with the at least one processor, cause the computing apparatus to: calculate a predicted demand 1414 based on the price elasticity; calculate a price of optimal margin 1416 based on the predicted demand and the price elasticity; and calculate the user-specific price for the item based at least on the appeal score and the price of optimal margin.

Figure 17:
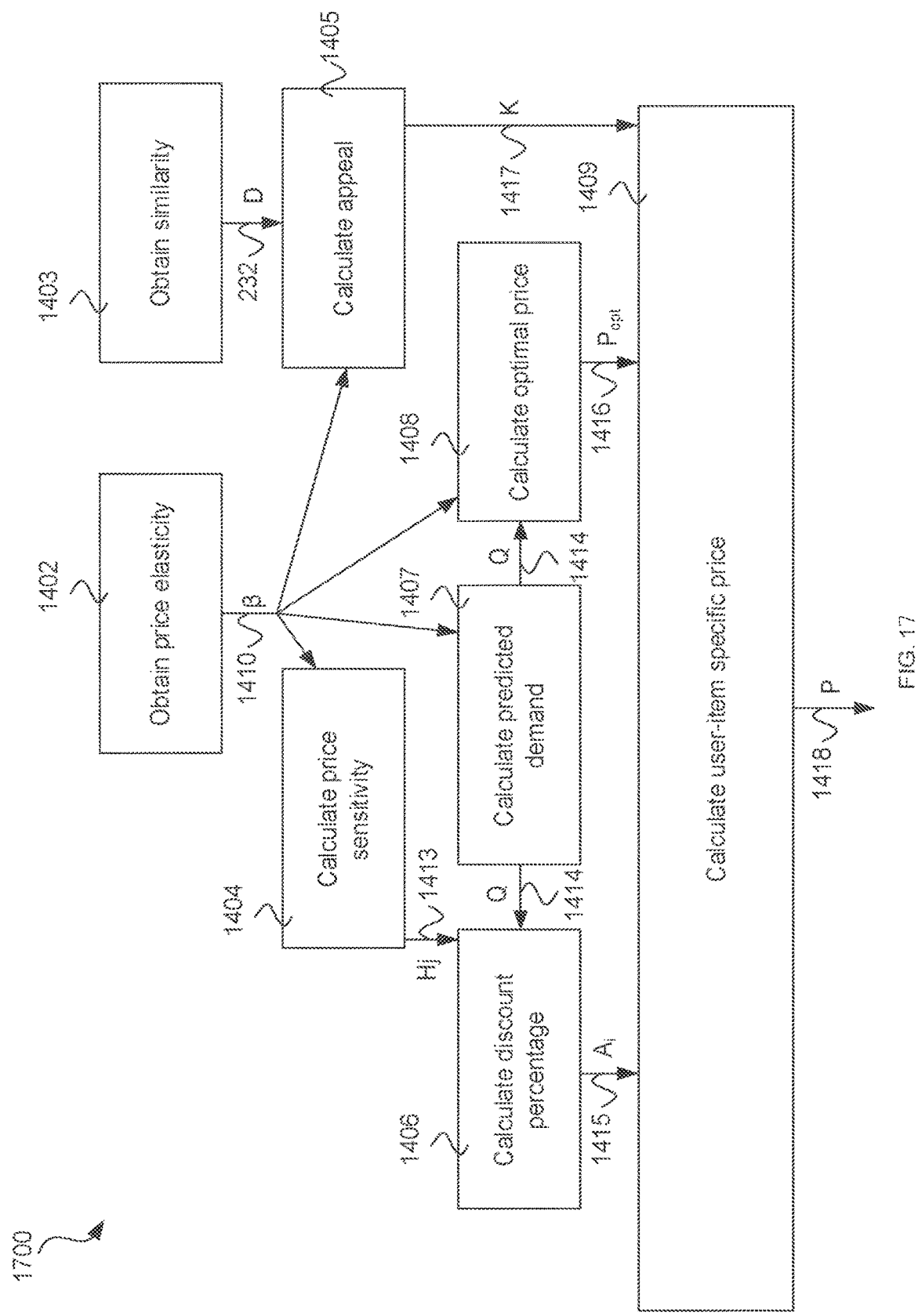
FIG. 17 illustrates a schematic representation of a user-item specific price calculation according to an embodiment.

FIG. 17 illustrates a flow chart 1400 representation of user-item specific price calculation procedure according to an embodiment. The procedure may be performed by, for example, the computing apparatus 200. Alternatively or additionally, different operations of the procedure may be performed by different devices. In some embodiments, operations do not need to be performed and/or any operation may comprise other operations. Any disclosure herein relating to any operation may also apply to the embodiment of FIG. 17.

In operation 1404, a user-specific price sensitivity Hj 1413 can be calculated. Price sensitivity of a user $Hj_i$ 1413 can be determined by, for example, setting the price sensitivity to be equal to the price elasticity of the user $\beta_i$ 1410: $Hj_i = \beta_i$. Alternatively or additionally, the price sensitivity of a user $Hj_i$ 1413 can be determined by, for example, calculating a statistic, such as a mean or a median price elasticity over different items for the user, an setting the price sensitivity to be equal to the statistic. For example, $Hj_i = avg_j(\beta i_j)$, where $avg_j(\beta i_j)$ takes the average price elasticity of the user i over the items j. Alternatively or additionally, the price sensitivity of a user $Hj_i$ can be determined by, for example, using some other estimation procedure.

In operation 1406, a user specific discount percentage 1415 can be calculated. The user specific discount percentage 1415 can be calculated, for example, based on the price sensitivity 1413 of the user and the predicted demand 1414.

According to an embodiment, the at least one memory and the computer program code are configured to, with the at least one processor, cause the computing apparatus to: calculate a discount percentage based at least on the predicted demand and the price sensitivity and calculate the user-specific price for the item based at least on the appeal score, the price of optimal margin, and the discount percentage.

Figure 18:
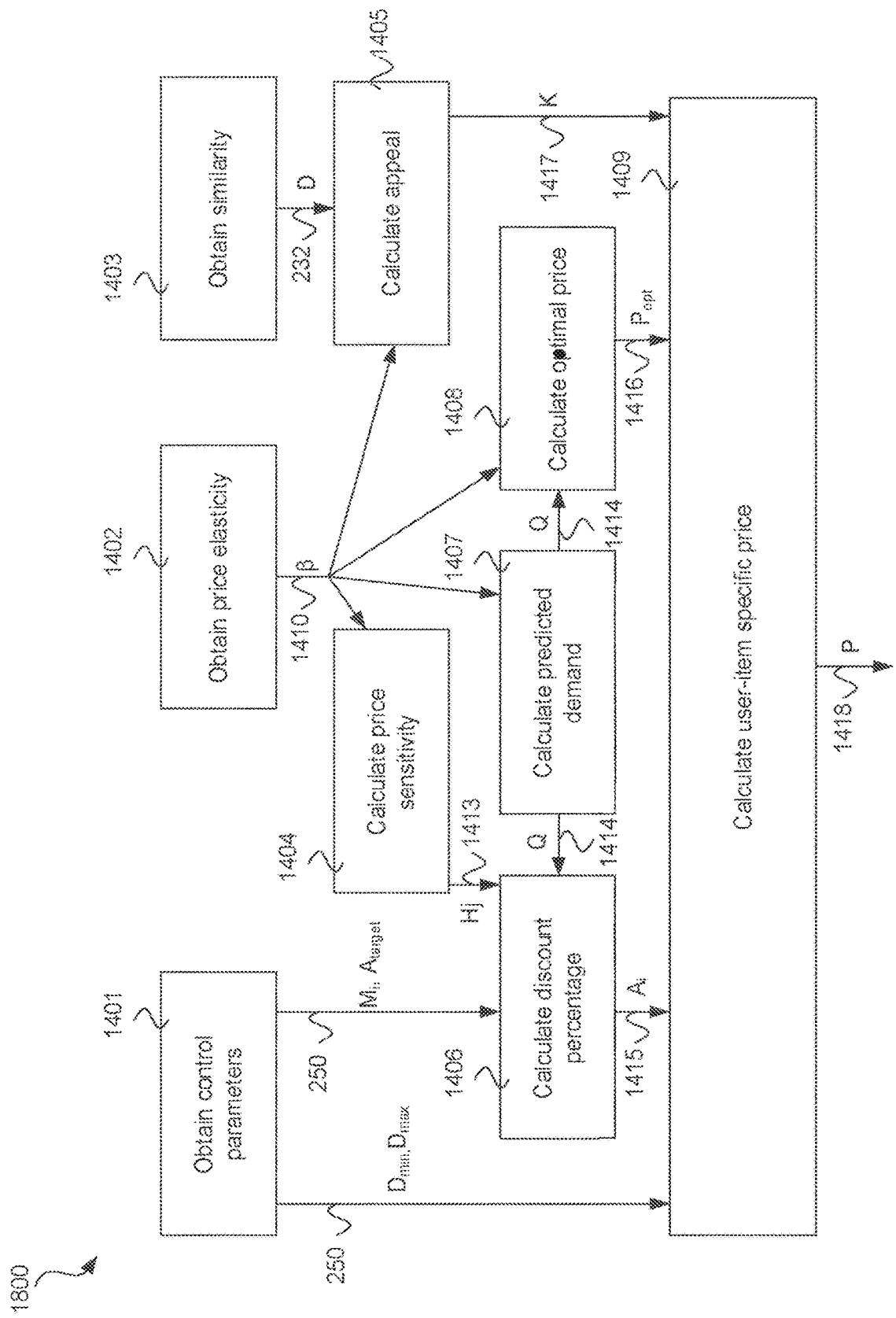
FIG. 18 illustrates a schematic representation of a user-item specific price calculation according to an embodiment.

FIG. 18 illustrates a flow chart 1800 representation of user-item specific price calculation procedure according to an embodiment. In the embodiment of FIG. 18, control parameters may not be used. Thus, calculation of user price sensitivity and/or calculation of a discount percentage may not be needed. The predicted demand Q 1414 may be fed into the user-item specific calculation 1409. Any disclosure herein relating to any operation may also apply to the embodiment of FIG. 18.

In operation 1401 control parameters 250 may be obtained. The control parameters 250 may determine, for example, the amount of discounts allocated for user-item specific pricing and/or limits for how much the user-item specific price can deviate from a list price. The control parameters 250 may comprise preconfigured control parameters. The control parameters may be configured by, for example, an administrator. Alternatively or additionally, at least some of the control parameters 250 may be calculated in an automated fashion by a device, such as the computing apparatus 200. The control parameters may comprise at least one control parameter.

In operation 1406, a user specific discount percentage 1415 can be determined. The user specific discount percentage $A_i$ 1415 can be determined, for example, from:

$$A_i = S \times A_{target} \times \frac{a_i}{\sum_i a_i},$$

where $$S = \frac{\sum M_i \times A_{target}}{\sum \left( M_i \times \frac{a_i}{\sum a_i} \right)}$$

and $$a_i = \frac{\sum M_i \times A_{target}}{\sum norm(Hj_i)} \times A_{target},$$

where $$norm(Hj_i) = \frac{Hj_i - \min(Hj_i)}{\max(Hj_i)}.$$

$M_i$ is a user specific sale volume prediction and $A_{target}$ is a parameter that describes allocation of user specific discounts compared to discounts visible to all users. The control parameters 250 may comprise $M_i$ and/or $A_{target}$. According to an embodiment, the control parameters comprise the user specific sale volume prediction $M_i$ and/or the parameter that describes allocation of user specific discounts compared to discounts visible to all users.

According to an embodiment, the at least one memory and the computer program code are configured to, with the at least one processor, cause the computing apparatus to obtain at least one control parameter 250 and calculate the discount percentage 1415 of the user based on the price sensitivity, the predicted demand, and the at least one control parameter.

According to an embodiment, the at least one control parameter comprises a target discount percentage and a user-specific sale volume prediction. As disclosed above, the computing apparatus 200 may, for example, calculate the discount percentage 1415 based on the target discount percentage and the user-specific sale volume prediction.

According to an embodiment, the at least one memory and the computer program code are configured to, with the at least one processor, cause the computing apparatus to: calculate the user-specific price for the item based at least on the appeal score, the price of optimal margin, the discount percentage, and the at least one control parameter.

In operation 1409, a user-item specific price 1418 can be determined. The user-item specific price P 1418 can be determined in a step-wise fashion. For each user, the user specific pricing can be started from the items that are most appealing to the user according to the appeal score K 1417 until a user specific discount percentage $A_i$ 1415 is fulfilled.

Based on the user-item specific appeal score $K_{ij}$, a user-item specific price $P_{ij}$ 1418 can be calculated for an appealing item for which a user specific price has not been calculated:

$$P_{ij} = \begin{cases} P_{opt,ij}, & P_{opt,ij} > P_{list,ij} \times (1 - D_{min}) \text{ or } P_{opt,ij} < P_{list,ij} \times (1 + D_{max}) \\ P_{list,ij} \times (1 - D_{min}), & P_{opt,ij} \leq P_{list,ij} \times (1 - D_{min}) \\ P_{list,ij} \times (1 + D_{max}), & P_{opt,ij} \geq P_{list,ij} \times (1 + D_{max}) \end{cases}$$

A user specific discount and user specific discount percentage can be calculated for all items. Based on the user-item specific price $P_{ij}$ 1418, a calculated user discount $A_{calc,i}$ can be calculated. The calculated discount $A_{calc,i}$ can be calculated, for example, based on the user-item specific price $P_{ij}$ 1418 and the list price.

According to an embodiment, the at least one control parameter comprises a first deviation parameter indicating an upper limit for the user-specific price of the item, and a second deviation parameter indicating a lower limit for the user-specific price of the item. The first deviation parameter may correspond to $D_{max}$ and the second deviation parameter may correspond to $D_{min}$. As disclosed above, the computing apparatus 200 may limit the user-specific price $P_{ij}$ so that $P_{ij}$ is not greater than the value indicated by $D_{max}$ and/or $P_{ij}$ is not less than the value indicated by $D_{min}$.

According to an embodiment, the at least one memory and the computer program code are configured to, with the at least one processor, cause the computing apparatus to: order a plurality of items according to the appeal score of each item and calculate a user-specific prices for the items in the order until the discount percentage is fulfilled.

For example, if $A_{calc,i}<A_i$, then $P_{ij}$ may be used as the user-item specific price. Otherwise, $P_{ij}=P_{list,ij}$, and calculating user specific prices for the user i may be stopped. Thus, the calculation of user-item specific prices for the user i may be continued as long as the condition $A_{calc,i}<A_i$ holds. In some embodiments, other conditions may be used. The value of $A_{calc,i}$ may increase as more user-item specific prices are calculated for the user i. For example, the value of $A_{calc,i}$ may be calculated in a cumulative fashion over the already calculated user-item specific prices $P_i$ over different items j.

All or some of the operations 1401-1409 may be performed by, for example, the computing apparatus 200. Alternatively or additionally, some of the operations 1401-1409 may be performed by some other device, such as the client device 100. For example, the client device 100 may request some information from the computing apparatus 200 and perform at least some of the operations 1401-1409 based on the retrieved information. The client device 100 may then provide the result of the operation to some other device, such as the computing apparatus 200.

Figure 19:
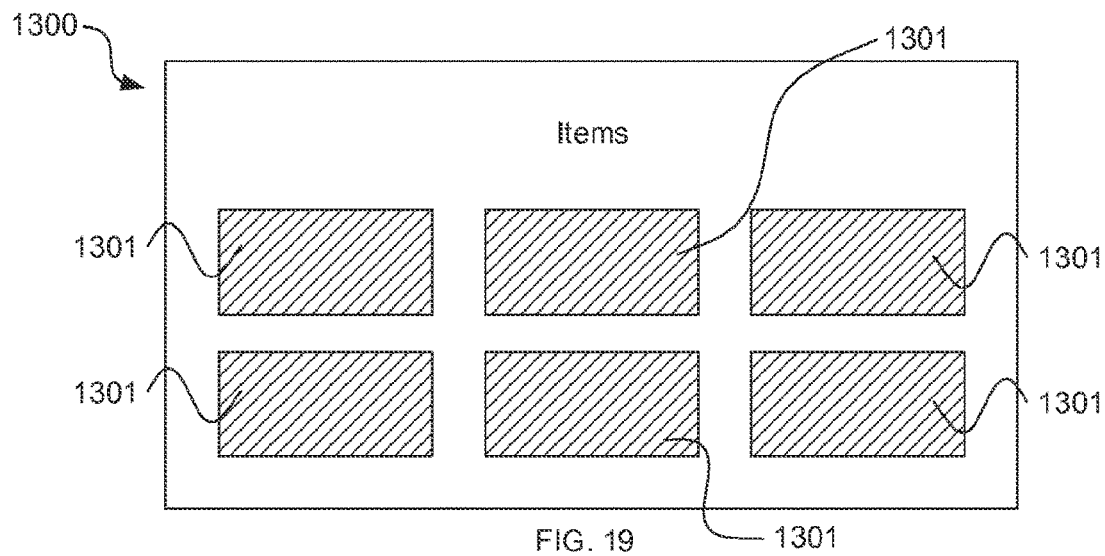
FIG. 19 illustrates a schematic representation of an item display interface according to an embodiment.

FIG. 19 illustrates a schematic representation of an item display interface 1300 according to an embodiment. The item display interface 1300 may be presented by the client device 100 to the user 101, and the content of the display interface 1300 can be based on data the client device 100 has received from the computing apparatus 200. The item display interface 1300 can, for example, be or be part of a starting page of a web site after a user 101 has logged in to the web site. Alternatively, the item display interface 1300 can be a separate page on a web site, for example, when the user 101 is viewing an item category. The user 101 may not be required to log into the web site. The item display interface 1300 comprises at least one item view 1301. The item views 1301 may display information about items. For example, a single item view 1301 may display a picture of an item and the name of the item.

As can be seen from FIG. 19, the number of item views 1301 that can be presented to the user 101 at a time may be limited. The size of the item views 1301 cannot be reduced without limit, since the item views 1301 should be clearly visible to the user 101. The item views 1301 may also comprise a plurality of components that should also be clearly visible to the user 101. This may be especially limiting, if the client device 100 is, for example, a mobile phone with a relatively small display. On such client devices 100, only few item views 1301 may fit onto the item display interface 1300. The size and layout of the item views 1301 may be scaled depending on the client device 100. The scaling may be executed by the client device 100 and/or by the computing apparatus 200. For example, if the client device 100 is a mobile phone, the item views 1301 may be arranged into a single column so that the user 101 only needs to scroll the item display interface 1300 along a single direction while the items views 1301 are displayed with sufficient clarity. On a client device 100 with a larger display, such as a desktop computer, a plurality of item views 1301 may fit into the item display interface 1300 side-by-side.

Using the user attribute profile 212 and the item attribute vectors 223 of each item, the computing apparatus 200 may choose the way the items views 1301 are displayed in the item display interface 1300 in such a way that the displayed items may be relevant and/or interesting to the user 101. According to an embodiment, the computing apparatus 200 calculates a similarity score 232 for each item, and the item views 1301 are arranged in the item display interface 1300 according to the similarity scores 232 of the items. According to another embodiment, the computing apparatus 200 calculates an ordering score $M_{i,k}$ for each item, and the item views 1301 are arranged in the item display interface 1300 according to the ordering scores $M_{i,k}$ of the items. The computing apparatus 200 may, for example, generate an item ordering list which may comprise a plurality of items ordered according to the ordering score $M_{i,k}$ of each item. The order may be, for example, ascending or descending.

According to embodiments, other criteria may also be applied to the ordering of the item views 1301. For example, top n most purchased items and/or item groups may not be ordered to the top of the item views 1301. n can be any number. According to a further embodiment, items that are part of the same item tree node as any of m previous items in the item ordering list. m can be any number. According to another embodiment, if a plurality of items and/or item groups have the same similarity score 232 and/or ordering score $M_{i,k}$, an item with a higher priority may be put first. Priority may be calculated based on various quantities, such as margin, sell volume etc.

The computing apparatus 200 may improve the user experience by improving the utilisation of the limited display space. Additionally, since the user 101 may find relevant items more easily and more quickly, the power consumption and amount of transferred data to/from the client device 100 may be reduced. For example, if relevant items are ordered to be within the first item views 1301 in the item display interface 1300, the item views 1301 of less relevant items may not need to be displayed or loaded by the client device 100. Thus, the amount of transferred data may be reduced, since data, such as pictures, about less relevant items does not need to be transferred to the client device 100. These advantages may apply to all embodiments illustrated herein.

Figure 20:
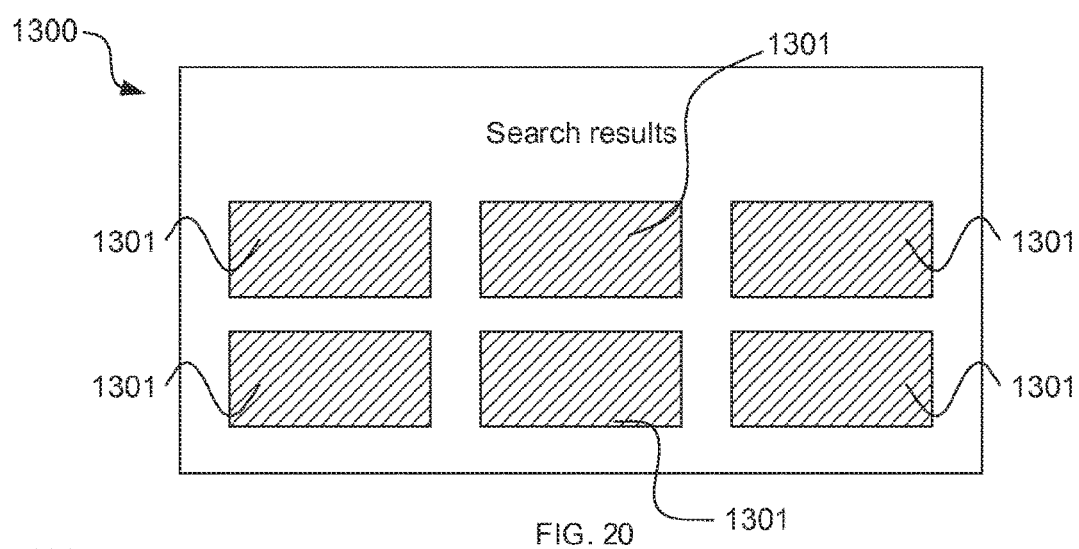
FIG. 20 illustrates a schematic representation of an item display interface according to another embodiment.

FIG. 20 illustrates a schematic representation of an item display interface 1300 according to another embodiment. In this embodiment, the item display interface 1300 may display search results, the search results can be displayed using the item views 1301, and the search results can be ordered based on the similarity scores 232 and/or the ordering scores $M_{i,k}$ of the items.

For example, if the user 101 searches for bread, different bread items may be ordered in the search results according to how well the item attribute vectors 223 of these items fit the user attribute profile 212 of the user 101. For example, if the user 101 searches for bread and the user attribute profile 212 indicates that the user 101 may prefer organic food items, the computing apparatus 200 may order different organic breads to the top of the search results. The computing apparatus 200 may calculate a similarity score 232 and/or ordering score $M_{i,k}$ for each bread item available based on the item attribute vector 223 of each bread item and the user attribute profile 212 of the user 101. If the user 101 prefers organic food items, the user attribute profile 212 should reflect this. In such a case, the similarity of organic breads may be higher with the user attribute profile 212 than that of other types of bread. The computing apparatus 200 and/or the client device 100 may then order the search results according to the similarity scores 232 and/or ordering scores of the items, and organic breads may be higher in the search results than other types of bread. It should be noted that this is only a simplified example, and other attributes may simultaneously affect the similarity scores and the ordering of the search results. Alternatively, this type of ordering may also be applied when the user 101 views an item category, such as "bread", instead of searching for bread.

Figure 21:
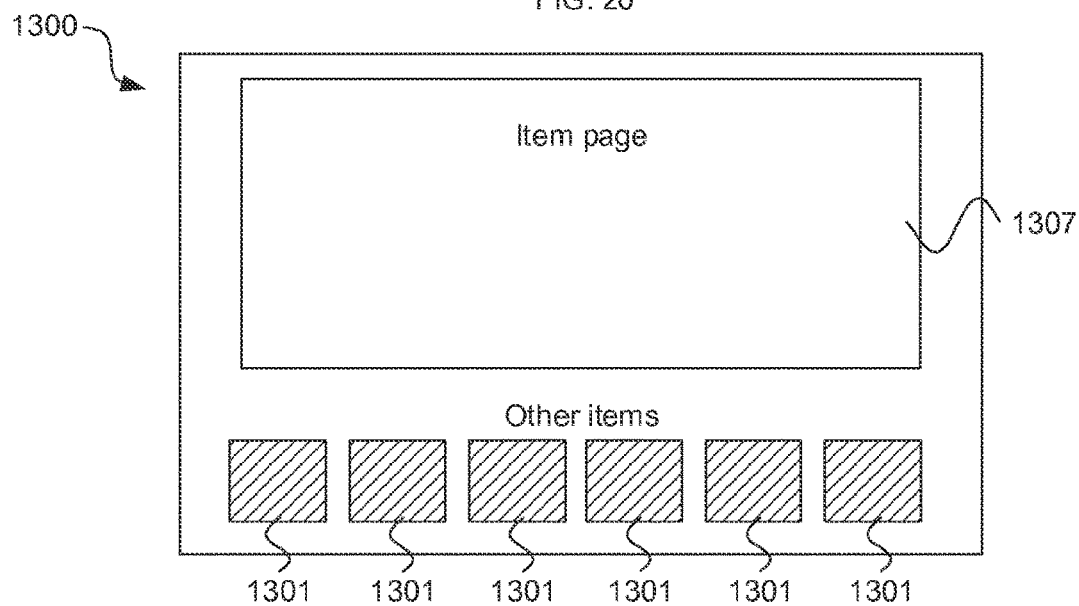
FIG. 21 illustrates a schematic representation of an item display interface according to another embodiment.

FIG. 21 illustrates a schematic representation of an item display interface 1300 according to another embodiment. In this embodiment, item views 1301 can be displayed in the item display interface 1300 with an item page 1307. The user 101 may have decided to view some item on a web site, and information about that item may be displayed to the user 101 in the item page 1307. The item page 1307 may comprise, for example, a picture of an item. The item views 1301 may be positioned, for example, at the bottom of the display interface 1300. The items displayed in the item views 1301 may be related/similar to the item displayed on the item page 1307. In such a case, the user attribute profile 212 may be used to display items that may suit the action history 211 and/or the user attribute profile 212 of the user 101 and that are related/similar to the item displayed on the item page 1307. Alternatively, the items displayed in the item views 1301 may not be related to the item displayed on the item page 1307, but they may be items that may, for example, fit the user attribute profile 212 of the user 101. For example, the computing apparatus 200 may calculate a similarity score 232 for a subset of items and high similarity items may be displayed in the item views 1301 based on these similarity scores 232.

Although in the embodiment described above, elements of the item display interface 1300 are illustrated using certain geometrical shapes, the elements may be of any shape and size, and they may be positioned in any way in the item display interface 1300. The elements of the item display interface 1300 may represent, for example, items or item related information. For example, the item views 1301 may be displayed as a list, as an array, or in any other order.

According to an embodiment, the at least one memory and the computer program code are configured to, with the at least one processor, cause the computing apparatus to transmit the user-specific price of the item to a client device.

According to an embodiment, the at least one memory and the computer program code are configured to, with the at least one processor, cause the computing apparatus to display the user-specific price of the item to a user of the computing apparatus.

In some embodiments, the computing apparatus 200 may be configured to display the item display interface 1300 to a user. For example, the computing apparatus 200 may be electrically coupled to a display device and the computing apparatus 200 may display the item display interface 1300 to a user using the display device.

Figure 22:
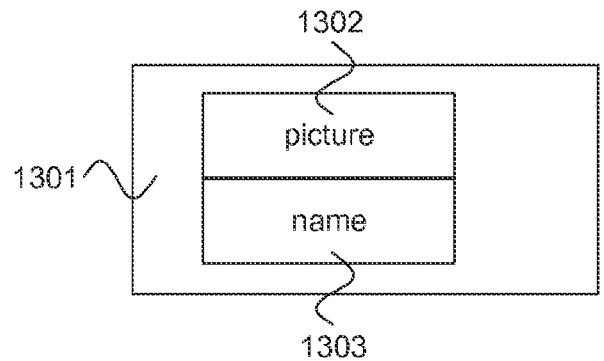
FIG. 22 illustrates a schematic representation of an item view according to an embodiment.

FIG. 22 illustrates a schematic representation of an item view 1301 according to an embodiment. In this embodiment, the item view 1301 comprises a picture 1302 and the name 1303 of an item. The item view 1301 may be used to display items to the user 101, for example, in the item display interface 1300.

Figure 23:
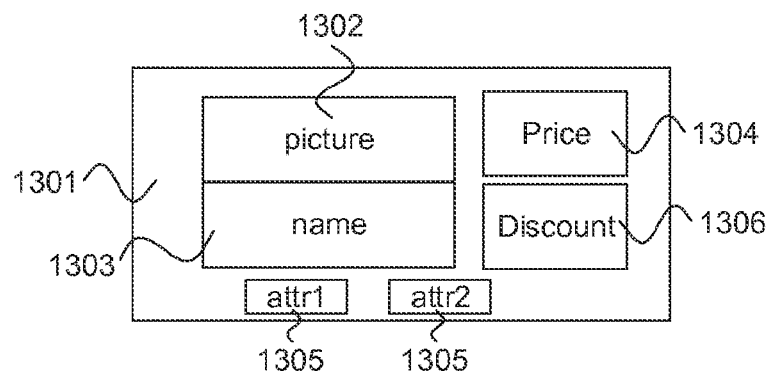
FIG. 23 illustrates a schematic representation of an item view according to another embodiment.

FIG. 23 illustrates a schematic representation of an item view 1301 according to another embodiment. In this embodiment, the item view 1301 comprises a picture 1302 and the name 1303 of the item. Additionally, the client device can be configured to display an attribute 1305 in the at least one item view 1306, wherein the attribute is associated with the item attribute vector of an item displayed in the item view 1301. In the embodiment of FIG. 19, the item view 1301 comprises two attributes 1305 of the item. However, this is only an example, and the number of attributes 1305 displayed may vary. The displayed attributes 1305 may be, for example, the attributes of the item that are most similar with the user attribute profile 212 of the user 101 and/or are important to the user 101 based on the user profile 210. For example, in the case of the user attribute profile vector 212 presented in FIG. 11, the displayed attributes could be "high protein" and "vegetarian", if the values of these attributes is 1 in the item attribute vector 223 of the item.

The item view 1301 may further comprise a price view 1304 of the item. The price view 1304 may comprise, for example, the user-item specific price 1418. Alternatively or additionally, the price view 1304 may comprise more than one price. The price view 1304 may comprise, for example, the user-item specific price 1418 and the list price of the item. The item view 1301 may further comprise an indication 1306 of a discount on the item. The indication 1306 may comprise, for example, a discount percentage of the item. The discount percentage may be calculated based on, for example, the user-item specific price 1418 and the list price of the item.

Figure 24:
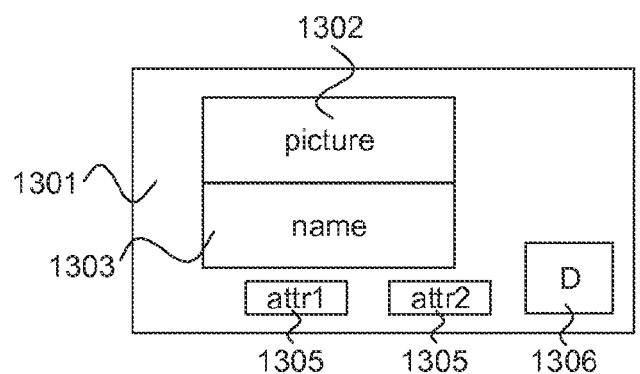
FIG. 24 illustrates a schematic representation of an item view according to another embodiment.

FIG. 24 illustrates a schematic representation of an item view 1301 according to another embodiment. In this embodiment, the item view 1301 further comprises a displayed similarity score 1306. According to an embodiment, the computing apparatus 200 is configured to transmit the similarity score 232 to the client device 100. According to an embodiment, the client device 100 is configured to receive the calculated similarity score 232 from the computing apparatus and display the displayed similarity score 1306 in at least one item view 1301, wherein the displayed similarity score is associated with the calculated similarity score. The client device 100 can calculate the displayed similarity score 1306, for example, from the calculated score 232. Alternatively, the computing apparatus 200 may transmit the displayed similarity score 1306 to the client device 100. The displayed similarity score 1306 may indicate how relevant the item is to the user 101 based on the user attribute profile 212 and the item attribute vector 223. Alternatively, the displayed similarity score 1306 may be different from the calculated similarity score 232. For example, the displayed similarity score 1306 may be presented as a percentage. As described earlier, a calculated similarity score 232 close to 0 may indicate a high similarity between an item attribute vector 223 and a user attribute profile 212. The displayed similarity score 1306 may be computed from the calculated similarity score 232, for example, in such a way that a displayed similarity score 1306 close to 100% indicates a high similarity and displayed similarity score 1306 close to 0% indicates a low similarity.

Any range or device value given herein may be extended or altered without losing the effect sought. Also any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as embodiments of implementing the claims and other equivalent features and acts are intended to be within the scope of the claims.

The functionality described herein can be performed, at least in part, by one or more computer program item components such as software components. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items. The term 'and/or' may be used to indicate that one or more of the cases it connects may occur. Both, or more, connected cases may occur, or only either one of the connected cases may occur.

The operations of the methods described herein may be carried out in any suitable order, or simultaneously where appropriate. Additionally, individual blocks may be deleted from any of the methods without departing from the objective and scope of the subject matter described herein. Aspects of any of the embodiments described above may be combined with aspects of any of the other embodiments described to form further embodiments without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, embodiments and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A computing apparatus comprising at least one processor and at least one memory including computer program code, the at least one memory and the computer program code configured to, with the at least one processor, cause the computing apparatus to:

calculate a user attribute profile vector based on a user action history of a user;

calculate a similarity score between the user attribute profile vector of the user and an item attribute vector of a plurality of items by comparing corresponding attribute values that are applicable to the plurality of items in the attribute profile vector and in the item attribute vector;

obtain a price elasticity;

calculate an appeal score based on the similarity score and the price elasticity;

choose a subset of items of the plurality of items based on the appeal score;

calculate a user-specific price of the selected subset of items of the plurality of items based at least on the appeal score and using the price elasticity;

determine a type of a client device;

based on a determination that the client device is a mobile device, generate a first item display interface for display on the client device, the first item display interface comprising the user-specific price of the selected subset of items of the plurality of items arranged in a single column and with a size scaled to be larger than a minimum size limit; and based on a determination that the client device is a desktop device, generate a second item display interface for display on the client device, the second item display interface comprising the user-specific price of the selected subset of items of the plurality of items arranged in a side-by-side view and with a size scaled to be larger than the minimum size limit.

2. The computing apparatus of claim 1, wherein the at least one memory and the computer program code are configured to, with the at least one processor, cause the computing apparatus to:

calculate the appeal score using a multiplication product comprising the similarity score and the price elasticity.

3. The computing apparatus of claim 1, wherein the at least one memory and the computer program code are configured to, with the at least one processor, cause the computing apparatus to:

calculate the price elasticity based on an action history of the user.

4. The computing apparatus of claim 1, wherein the at least one memory and the computer program code are configured to, with the at least one processor, cause the computing apparatus to:

calculate a predicted demand based on the price elasticity;

calculate a price of optimal margin based on the predicted demand and using the price elasticity; and calculate the user-specific price for the plurality of items based at least on the appeal score and the price of optimal margin.

5. The computing apparatus of claim 4, wherein the at least one memory and the computer program code are configured to, with the at least one processor, cause the computing apparatus to:

calculate a discount percentage based at least on the predicted demand and the price sensitivity; and calculate the user-specific price for the plurality of items based at least on the appeal score, the price of optimal margin, and the discount percentage.

6. The computing apparatus of claim 5, wherein the at least one memory and the computer program code are configured to, with the at least one processor, cause the computing apparatus to:

obtain at least one control parameter; and calculate the discount percentage of the user based on the price sensitivity, the predicted demand, and the at least one control parameter.

7. The computing apparatus of claim 6, wherein the at least one control parameter comprises a target discount percentage and a user-specific sale volume prediction.

8. The computing apparatus of claim 1, wherein at least one control parameter comprises a first deviation parameter indicating an upper limit for the user-specific price of the plurality of items, and a second deviation parameter indicating a lower limit for the user-specific price of the plurality of items.

9. The computing apparatus of claim 6, wherein the at least one memory and the computer program code are configured to, with the at least one processor, cause the computing apparatus to:
calculate the user-specific price for the plurality of items based at least on the appeal score, the price of optimal margin, the discount percentage, and the at least one control parameter.

10. The computing apparatus of claim 5, wherein the at least one memory and the computer program code are configured to, with the at least one processor, cause the computing apparatus to:
order the plurality of items according to the appeal score of each item; and
calculate the user-specific price for the plurality of items in the order until the discount percentage is fulfilled.

11. The computing apparatus of claim 1, wherein the at least one memory and the computer program code are configured to, with the at least one processor, cause the computing apparatus to:
transmit the user-specific price of the plurality of items to a client device.

12. The computing apparatus of claim 1, wherein the at least one memory and the computer program code are configured to, with the at least one processor, cause the computing apparatus to:
display the user-specific price of the plurality of items to a user of the computing apparatus.

13. A computer-implemented method comprising:
calculating, by one or more processors, a user attribute profile vector based on a user action history of a user;
calculating, by the one or more processors, a similarity score between the user attribute profile vector of the user and an item attribute vector of a plurality of items by comparing corresponding attribute values that are applicable to the plurality of items in the attribute profile vector and in the item attribute vector;
obtaining, by the one or more processors, a price elasticity;
calculating, by the one or more processors, an appeal score based on the similarity score and the price elasticity;
choosing, by the one or more processors, a subset of items of the plurality of items based on the appeal score;
calculating, by the one or more processors, a user-specific price of the selected subset of items of the plurality of items based at least on the appeal score and using the price elasticity;
determining, by the one or more processors, that a client device is a mobile device;
based on the determination that the client device is a mobile device, generating, by the one or more processors, an item display interface for display on the client device, the item display interface comprising the user-specific price of the selected subset of items of the plurality of items arranged in a single column and with a size scaled to be larger than a minimum size limit.

* * * * *